(12) United States Patent
Lin

(10) Patent No.: US 12,739,754 B2
(45) Date of Patent: Sep. 15, 2026

(54) METHODS AND APPARATUSES FOR UPLINK POWER CONTROL FOR SMALL DATA TRANSMISSION WHEN IN A NON-CONNECTED STATE

(71) Applicant: Telefonaktiebolaget LM Ericsson (publ), Stockholm (SE)

(72) Inventor: Zhipeng Lin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 18/280,982

(22) PCT Filed: Mar. 22, 2022

(86) PCT No.: PCT/CN2022/082172
§ 371 (c)(1),
(2) Date: Sep. 8, 2023

(87) PCT Pub. No.: WO2022/199565
PCT Pub. Date: Sep. 29, 2022

(65) Prior Publication Data

US 2024/0155502 A1 May 9, 2024

(30) Foreign Application Priority Data

Mar. 24, 2021 (WO) ................ PCT/CN2021/082642

(51) Int. Cl.
*H04W 52/14* (2009.01)
*H04W 52/36* (2009.01)

(52) U.S. Cl.
CPC ......... *H04W 52/146* (2013.01); *H04W 52/36* (2013.01)

(58) Field of Classification Search
CPC . H04W 52/146; H04W 52/36; H04W 52/242; H04W 52/247; H04W 52/248
See application file for complete search history.

(56) References Cited

U.S. PATENT DOCUMENTS

2020/0267696 A1* 8/2020 Li ......................... H04W 76/27
2022/0248488 A1* 8/2022 Sen ....................... H04W 76/34

FOREIGN PATENT DOCUMENTS

WO WO-2020056738 A1 * 3/2020 ............ H04W 88/02

OTHER PUBLICATIONS

Author Unknown, "Technical Specification Group Radio Access Network; NR; User Equipment (UE) radio transmission and reception; Part 1: Range 1 Standalone (Release 17)," Technical Specification 38.101-1, Version 17.0.0, Dec. 2020, 3GPP Organizational Partners, 488 pages.

(Continued)

*Primary Examiner* — John J Lee
(74) *Attorney, Agent, or Firm* — Withrow & Terranova, PLLC

(57) ABSTRACT

The present disclosure is related to power control for small data transmission (SDT). The method at a user equipment (UE) for controlling transmission power for configured grant (CG) based SDT in a non-connected state comprises: performing a measurement on a first reference signal transmitted by a network node to determine a path loss for the UE; and determining the transmission power for the CG based SDT at least partially based on the determined path loss.

18 Claims, 11 Drawing Sheets

(56) References Cited

OTHER PUBLICATIONS

Author Unknown, "Technical Specification Group Radio Access Network; NR; User Equipment (UE) radio transmission and reception; Part 2: Range 2 Standalone (Release 17)," Technical Specification 38.101-2, Version 17.0.0, Dec. 2020, 3GPP Organizational Partners, 180 pages.
Author Unknown, "Technical Specification Group Radio Access Network; NR; User Equipment (UE) radio transmission and reception; Part 3: Range 1 and Range 2 Interworking operation with other radios (Release 17)," Technical Specification 38.101-3, Version 17.0.0, Dec. 2020, 3GPP Organizational Partners, 667 pages.
Author Unknown, "Technical Specification Group Radio Access Network; NR; Multiplexing and channel coding (Release 16)," Technical Specification 38.212, Version 16.4.0, Dec. 2020, 3GPP Organizational Partners, 152 pages.
Author Unknown, "Technical Specification Group Radio Access Network; NR; Physical layer procedures for control (Release 16)," Technical Specification 38.213, Version 16.4.0, Dec. 2020, 3GPP Organizational Partners, 181 pages.
Author Unknown, "Technical Specification Group Radio Access Network; NR; Physical layer procedures for data (Release 16)," Technical Specification 38.214, Version 16.4.0, Dec. 2020, 3GPP Organizational Partners, 169 pages.
Author Unknown, "Technical Specification Group Radio Access Network; NR; Physical layer measurements (Release 16)," Technical Specification 38.215, Version 16.4.0, Dec. 2020, 3GPP Organizational Partners, 25 pages.
Author Unknown, "Technical Specification Group Radio Access Network; NR; User Equipment (UE) radio access capabilities (Release 16)," Technical Specification 38.306, Version 16.3.0, Dec. 2020, 3GPP Organizational Partners, 135 pages.
Author Unknown, "Technical Specification Group Radio Access Network; NR; Medium Access Control (MAC) protocol specification (Release 16)," Technical Specification 38.321, Version 16.3.0, Dec. 2020, 3GPP Organizational Partners, 156 pages.
Author Unknown, "Technical Specification Group Radio Access Network; NR; Radio Resource Control (RRC) protocol specification (Release 16)," Technical Specification 38.331, Version 16.3.1, Jan. 2021, 3GPP Organizational Partners, 932 pages.
Ericsson, "R1-1909996: Support for transmission in preconfigured UL resources in NB-IoT," 3GPP TSG-RAN WG1 Meeting #98bis, Chongqing, China, Oct. 14-20, 2019, 15 pages.
Huawei, et al., "R1-1906051: Discussion on 2-step RACH procedure," 3GPP TSG RAN WG1 Meeting #97, May 13-17, 2019, Reno, Nevada, 12 pages.
International Search Report and Written Opinion for International Patent Application No. PCT/CN2022/082172, mailed Aug. 22, 2022, 22 pages.

* cited by examiner (a) Configured Grant-based SDT procedure (b) PUSCH resources pre-configured by CG Type 1 scheme

METHODS AND APPARATUSES FOR UPLINK POWER CONTROL FOR SMALL DATA TRANSMISSION WHEN IN A NON-CONNECTED STATE

CROSS-REFERENCE TO RELATED APPLICATION(S)

This application is a 35 U.S.C. § 371 national phase filing of International Application No. PCT/CN2022/082172, filed Mar. 22, 2022, which claims priority to International Application No. PCT/CN2021/082642, filed on Mar. 24, 2021, the disclosures of which are incorporated herein by reference in their entireties.

TECHNICAL FIELD

The present disclosure is related to the field of telecommunication, and in particular, to methods, user equipments (UEs), and network nodes for power control for small data transmission (SDT).

BACKGROUND

With the development of the electronic and telecommunications technologies, mobile devices, such as mobile phones, smart phones, laptops, tablets, vehicle mounted devices, Internet of Things (IoT) devices (such as, sensors), become an important part of our daily lives. To support a numerous number of mobile devices, a highly efficient Radio Access Network (RAN), such as a fifth generation (5G) New Radio (NR) RAN, is proposed.

5G NR RAN needs to support services that typically require only infrequent small data traffic. Examples of such services may include traffic from instant messaging (IM) services like WhatsApp and WeChat, heart-beat traffic from IM/email clients and other apps, push notifications from various apps, industrial wireless sensors transmitting temperature, pressure data periodically, etc.

Further, 5G NR RAN supports the RRC_INACTIVE state, and UEs with infrequent (periodic and/or non-periodic) data transmission are generally maintained by the network in the RRC_CONNECTED state. Until NR Rel-16, the RRC_INACTIVE state does not support data transmission. Hence, the UE has to resume the connection (i.e., move to the RRC_CONNECTED state) for any downlink (DL) and uplink (UL) data. A connection setup and a subsequent release to the RRC_INACTIVE state has to happen for each data transmission regardless of how small and infrequent the data packets are. This results in unnecessary power consumption and signaling overhead. The signaling overhead for setting up connections before each transmission can sometimes be even greater than the size of the actual data payload. To reduce the signaling overhead and improve UE battery life, in NR Rel-17, a work item on NR small data transmission (SDT) in the RRC_INACTIVE state is ongoing.

SUMMARY

According to a first aspect of the present disclosure, a method at a user equipment (UE) for controlling transmission power for configured grant (CG) based small data transmission (SDT) in a non-connected state is provided. The method comprises: performing a measurement on a first reference signal transmitted by a network node to determine a path loss for the UE; and determining the transmission power for the CG based SDT at least partially based on the determined path loss.

In some embodiments, the method further comprises: receiving a configured grant from the network node which indicates one or more uplink transmission occasions for SDT; and determining a reference signal associated with at least one of the uplink transmission occasions, as the first reference signal. In some embodiments, the method further comprises: transmitting, to the network node, one or more data bits for SDT over the at least one uplink transmission occasion associated with the first reference signal. In some embodiments, the first reference signal is a synchronous signal block (SSB) or a Channel State Information-Reference Signal (CSI-RS).

In some embodiments, the method further comprises: receiving a message which is associated with the first reference signal and broadcasted by the network node. In some embodiments, the message is a Radio Resource Control (RRC) Master Information Block (MIB) message and the first reference signal is a synchronous signal block (SSB) associated with the RRC MIB message.

In some embodiments, the method further comprises one or more of: suspending transmission power control (TPC) accumulation for the UE in response to determining that a second reference signal which is different from the first reference signal is received; neglecting at least a part of TPC commands for the UE in response to determining that a second reference signal which is different from the first reference signal is received; suspending power update for the UE in response to determining that a second reference signal which is different from the first reference signal is received; and continuing the power update based on the latest configured power control parameters in response to determining that a second reference signal which is different from the first reference signal is received.

In some embodiments, the TPC commands that are neglected are the TPC commands received before the second reference signal is received. In some embodiments, the step of suspending power update for the UE comprises: suspending an update procedure for updating the Physical Uplink Shared Channel (PUSCH) power control adjustment state for the UE. In some embodiments, the step of suspending TPC accumulation for the UE comprises: performing only absolute TPC commands from the network node for the UE. In some embodiments, the step of determining the transmission power for the CG based SDT at least partially based on the determined path loss comprises: determining the transmission power for the CG based SDT further based on a PUSCH power control adjustment state which is determined by a TPC command with an absolute value received from the network node. In some embodiments, the TPC command is received in a Downlink Control Information (DCI) format 2_2 message with Cyclic Redundancy Check (CRC) scrambled by TPC-PUSCH-RNTI. In some embodiments, the TPC command has a predetermined value. In some embodiments, the step of determining the transmission power for the CG based SDT at least partially based on the determined path loss comprises: determining the transmission power for the CG based SDT further based on a PUSCH power control adjustment state which has a zero value.

In some embodiments, the step of determining the transmission power for the CG based SDT at least partially based on the determined path loss comprises: determining the transmission power for the CG based SDT further based on a PUSCH power control adjustment state $f_{b,f,c}(i, l)$ for active uplink (UL) bandwidth part (BWP) b of carrier f of serving cell c and PUSCH transmission occasion i, wherein the PUSCH power control adjustment state comprises one or more power ramping steps. In some embodiments, the PUSCH power control adjustment state $f_{b,f,c}(i, l)$ is determined as follows: $f_{b,f,c}(i, l)=f_{b,f,c}(i-1, l)+k*\Delta P_{rampup,b,f,c}$, where $\Delta P_{rampup,b,f,c}$ is a power ramping step, k is the power ramping counter, and l is the index of the PUSCH power control adjustment state $f_{b,f,c}(i, l)$. In some embodiments, the method further comprises: suspending power ramping for the UE in response to determining that a second reference signal which is different from the first reference signal is received.

In some embodiments, the non-connected state is an RRC_INACTIVE state or an RRC_IDLE state while the connected state is an RRC_CONNECTED state.

According to a second aspect of the present disclosure, a method at a user equipment (UE) for controlling transmission power for configured grant (CG) based small data transmission (SDT) in a non-connected state is provided. The method comprises: receiving, from a network node, one or more parameters for power control; and determining the transmission power for the CG based SDT at least partially based on the received one or more parameters.

In some embodiments, the one or more parameters comprise at least one of: a parameter indicating a nominal value for CG based SDT power control; one or more parameters indicating one or more P0values and/or path loss scaling factors; a parameter indicating a reference signal index for path loss estimation; a parameter for determining delta power related to Modulation & Coding Scheme (MCS) used for the CG-based SDT; and a parameter indicating whether TPC accumulation is enabled or not. In some embodiments, at least one of the one or more parameters is received via an RRC message, a Medium Access Control (MAC) Protocol Data Unit (PDU) message, and/or a DCI message. In some embodiments, the RRC message is dedicated for the UE's SDT power control and comprises a whole PUSCH-PowerControl Information Element (IE). In some embodiments, the RRC message is an RRC release message which triggers the UE to transition into the non-connected state.

In some embodiments, the step of determining the transmission power for the CG based SDT at least partially based on the received one or more parameters comprises: determining the transmission power for the CG based SDT further based on a parameter indicating a nominal value for power control for Msg3 PUSCH when a 4-step Random Access Channel (RACH) procedure was previously involved or a nominal value for MsgA PUSCH when a 2-step RACH procedure was previously involved, in response to determining that the one or more parameters comprises no parameter indicating a nominal value for CG based SDT power control.

In some embodiments, the one or more parameters further comprise a parameter indicating which of the P0-PUSCH-AlphaSets is selected if more than one parameter indicating P0-PUSCH-AlphaSets are received. In some embodiments, the step of determining the transmission power for the CG based SDT at least partially based on the received one or more parameters comprises: determining the transmission power for the CG based SDT further based on a parameter indicating a P0 value and/or a path loss scaling factor for power control for Msg3 PUSCH when a 4-step Random Access Channel (RACH) procedure was previously involved or a P0 value and/or a path loss scaling factor for MsgA PUSCH when a 2-step RACH procedure was previously involved, in response to determining that the one or more parameters comprises no parameter indicating a P0 value for CG based SDT power control and/or no parameter indicating a path loss scaling factor for the UE.

In some embodiments, the one or more parameters comprise at least one of: a parameter indicating an uplink transmission scheme configuration; a parameter indicating an uplink full power mode configuration; and a Sounding Reference Signal (SRS) resource set. In some embodiments, the parameter indicating an uplink transmission scheme configuration indicates that only non-Codebook based TX scheme is used for CG-based SDT. In some embodiments, the parameter indicating an uplink full power mode configuration has a predetermined value of "fullpower". In some embodiments, the step of determining the transmission power for the CG based SDT at least partially based on the received one or more parameters comprises: determining the transmission power for the CG based SDT at least partially based on the received one or more parameters with a predetermined power scaling value being used.

According to a third aspect of the present disclosure, a user equipment (UE) is provided. The UE comprises: a processor; a memory storing instructions which, when executed by the processor, cause the processor to perform any of the methods of the first and/or second aspects.

According to a fourth aspect of the present disclosure, a method at a network node for controlling transmission power for configured grant (CG) based small data transmission (SDT) for a user equipment (UE) in a non-connected state is provided. The method comprises: transmitting, to the UE, a first reference signal to facilitate the UE in determining a path loss; and receiving, from the UE in the non-connected state, one or more data bits for SDT.

In some embodiments, the method further comprises: transmitting, to the UE, a configured grant which indicates one or more uplink transmission occasions for SDT. In some embodiments, the step of receiving, from the UE in the non-connected state, one or more data bits for SDT comprises: receiving, from the UE in the non-connected state, one or more data bits for SDT over the at least one uplink transmission occasion associated with the first reference signal. In some embodiments, the first reference signal is a synchronous signal block (SSB) or a Channel State Information-Reference Signal (CSI-RS). In some embodiments, the method further comprises: broadcasting a message which is associated with the first reference signal. In some embodiments, the message is a Radio Resource Control (RRC) Master Information Block (MIB) message and the first reference signal is a synchronous signal block (SSB) associated with the RRC MIB message. In some embodiments, the non-connected state is an RRC_INACTIVE state or an RRC_IDLE state while the connected state is an RRC_CONNECTED state.

According to a fifth aspect of the present disclosure, a method at a network node for controlling transmission power for configured grant (CG) based small data transmission (SDT) for a user equipment (UE) in a non-connected state is provided. The method comprises: transmitting, to the UE, one or more parameters for power control; and receiving, from the UE in the non-connected state, one or more data bits for SDT.

In some embodiments, the one or more parameters comprise at least one of: a parameter indicating a nominal value for CG based SDT power control; one or more parameters indicating one or more P0 values and/or path loss scaling factors; a parameter indicating a reference signal index for path loss estimation; a parameter for determining delta power related to Modulation & Coding Scheme (MCS) used for the CG-based SDT; and a parameter indicating whether TPC accumulation is enabled or not.

In some embodiments, at least one of the one or more parameters is transmitted via an RRC message, a Medium Access Control (MAC) Protocol Data Unit (PDU) message, and/or a DCI message. In some embodiments, the RRC message is dedicated for the UE's SDT power control and comprises a whole PUSCH-PowerControl Information Element (IE). In some embodiments, the RRC message is an RRC release message which triggers the UE to transition into the non-connected state. In some embodiments, the one or more parameters further comprise a parameter indicating which of the P0-PUSCH-AlphaSets is selected if more than one parameter indicating P0-PUSCH-AlphaSets are received.

In some embodiments, the one or more parameters comprise at least one of: a parameter indicating an uplink transmission scheme configuration; a parameter indicating an uplink full power mode configuration; and a Sounding Reference Signal (SRS) resource set. In some embodiments, the parameter indicating an uplink transmission scheme configuration indicates that only non-Codebook based transmission scheme is used for CG-based SDT. In some embodiments, the parameter indicating an uplink full power mode configuration has a predetermined value of "fullpower".

According to a sixth aspect of the present disclosure, a network node is provided. The network node comprises: a processor; a memory storing instructions which, when executed by the processor, cause the processor to perform any of the methods of the fourth and/or fifth aspects.

According to a seventh aspect of the present disclosure, a computer program comprising instructions is provided. The instructions, when executed by at least one processor, cause the at least one processor to carry out the method of any of the first, second, fourth, and/or fifth aspects.

According to an eighth aspect of the present disclosure, a carrier containing the computer program of the seventh aspect is provided. The carrier is one of an electronic signal, optical signal, radio signal, or computer readable storage medium.

According to a ninth aspect of the present disclosure, a telecommunications system, comprising one or more UEs of the third aspect; and at least one network node of the sixth aspect.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

DETAILED DESCRIPTION

Figure 1:
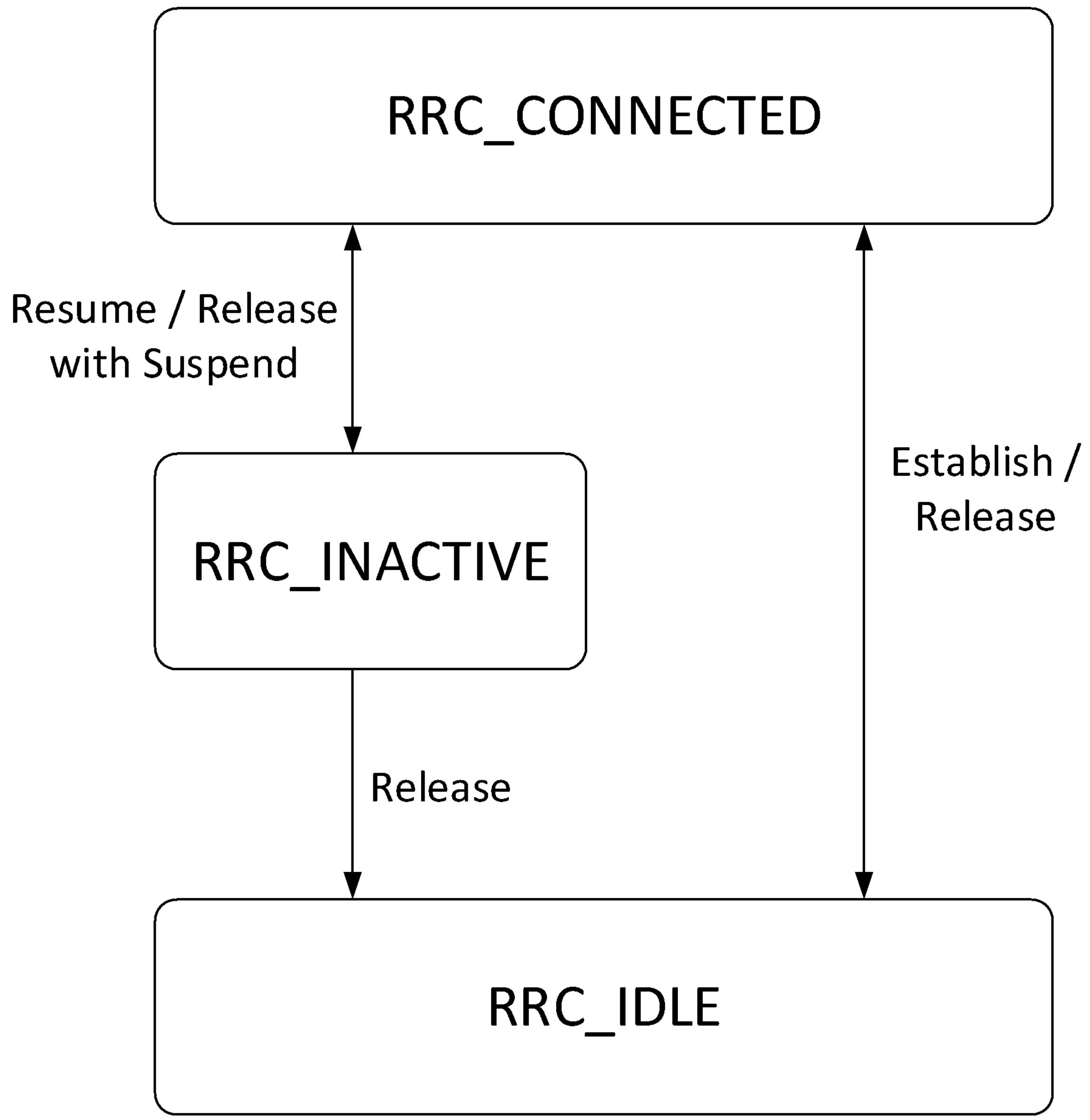
FIG. 1 is an overview diagram illustrating an exemplary UE RRC state machine and state transitions with which a UE according to an embodiment of the present disclosure is operable.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/ or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G New Radio (NR), the present disclosure is not limited thereto. In fact, as long as power control for SDT is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 4th Generation Long Term Evolution (LTE), LTE-Advance (LTE-A), or 5th Generation New Radio (5G NR), etc. Therefore, one skilled in the arts could readily understand that the terms used herein may also refer to their equivalents in any other infrastructure. For example, the term "User Equipment" or "UE" used herein may refer to a terminal device, a mobile device, a mobile terminal, a mobile station, a user device, a user terminal, a wireless device, a wireless terminal, or any other equivalents. For another example, the term "gNB" used herein may refer to a network node, a base station, a base transceiver station, an access point, a hot spot, a NodeB, an Evolved NodeB, a network element, or any other equivalents. Further, please note that the term "field" used herein may refer to an attribute, a setting, a configuration, a profile, an identifier, an indicator, one or more bits/octets, or any data by which information of interest may be indicated directly or indirectly.

Further, following 3GPP documents are incorporated herein by reference in their entireties:

3GPP TS 38.213 V16.4.0 (2020-12), 3rd Generation Partnership Project; Technical Specification Group Radio Access Network; NR; Physical layer procedures for control (Release 16);

3GPP TS 38.214 V16.4.0 (2020-12), 3rd Generation Partnership Project; Technical Specification Group Radio Access Network; NR; Physical layer procedures for data (Release 16);

3GPP TS 38.321 V16.3.0 (2020-12), 3rd Generation Partnership Project; Technical Specification Group Radio Access Network; NR; Medium Access Control (MAC) protocol specification (Release 16); and 3GPP TS 38.331 V16.3.1 (2021-01), 3rd Generation Partnership Project; Technical Specification Group Radio Access Network; NR; Radio Resource Control (RRC) protocol specification (Release 16).

Some of the embodiments of the present disclosure provide different methods for enabling CG PUSCH power control in the RRC inactive state or the RRC idle state, where the CG PUSCH resources may be mapped to SSBs and are needed for CG-based SDT. Hereinafter, the term "CG PUSCH resource", also known as "CG resource" or "CG configured PUSCH resource", may refer to the time, frequency, and/or DMRS resources configured in a configured grant for PUSCH transmissions.

FIG. 1 is an overview diagram illustrating an exemplary UE RRC state machine and state transitions with which a UE according to an embodiment of the present disclosure is operable. As shown in FIG. 1, a UE is either in the RRC_CONNECTED state or in the RRC_INACTIVE state when an RRC connection has been established. If this is not the case, i.e., no RRC connection is established, the UE is in the RRC_IDLE state. The RRC states can further be characterized as follows:

RRC Idle:
- A UE specific discontinuous reception (DRX) may be configured by upper layers;
- UE controlled mobility based on network configuration;
- The UE may:
  - monitor Short Messages transmitted with Paging-Radio Network Temporary Identifier (P-RNTI) over DCI;
  - monitor a Paging channel for Core Network (CN) paging using 5G-Serving-Temporary Mobile Subscriber Identity (5G-S-TMSI);
  - perform neighboring cell measurements and cell (re-) selection;
  - acquire system information and can send system information (SI) request (if configured).
  - perform logging of available measurements together with location and time for logged measurement configured UEs.

RRC Inactive:
- A UE specific DRX may be configured by upper layers or by RRC layer;
- UE controlled mobility based on network configuration;
- The UE stores the UE Inactive Access Stratum (AS) context;
- A RAN-based notification area is configured by RRC layer;
- The UE may:
  - monitor Short Messages transmitted with P-RNTI over DCI;
  - monitor a Paging channel for CN paging using 5G-S-TMSI and RAN paging using fullI-RNTI;
  - perform neighboring cell measurements and cell (re-) selection;
  - perform RAN-based notification area updates periodically and when moving outside the configured RAN-based notification area;
  - acquire system information and can send SI request (if configured).
  - perform logging of available measurements together with location and time for logged measurement configured UEs.

RRC Connected:
- The UE stores the AS context;
- Transfer of unicast data to/from UE;
- At lower layers, the UE may be configured with a UE specific DRX;
- For UEs supporting carrier aggregation (CA), use of one or more secondary cells (SCells), aggregated with the special cell (SpCell), for increased bandwidth;
- For UEs supporting dual connectivity (DC), use of one secondary cell group (SCG), aggregated with the master cell group (MCG), for increased bandwidth;
- Network controlled mobility within NR and to/from Evolved Universal Terrestrial Radio Access (E-UTRA);
- The UE may:
  - monitor Short Messages transmitted with P-RNTI over DCI, if configured;
  - monitor control channels associated with the shared data channel to determine if data is scheduled for it;
  - provide channel quality and feedback information;
  - perform neighboring cell measurements and measurement reporting;
  - acquire system information;
  - perform immediate minimization of drive tests (MDT) measurement together with available location reporting.

From above, unlike LTE, in NR there is an additional RRC state "RRC_INACTIVE" between the RRC_CONNECTED and RRC_IDLE and a UE can optionally stay in this RRC_INACTIVE state without completely releasing the RRC connection when there is no traffic and quickly switch back to the RRC_CONNECTED state when necessary.

As shown in FIG. 1, an RRC release message with a suspendConfig Information Element (IE) will move the UE from the RRC_CONNECTED state to the RRC_INACTIVE state, and an RRC resume message will take it back to the RRC_CONNECTED state. Similarly, an RRC release message without a suspendConfig IE or an abnormal failure will put the UE in the RRC_IDLE state. However, the present disclosure is not limited thereto. In some other embodiments, different conditions for the state transitions may be applicable.

Further, please note that although some embodiments of the present disclosure are described below with reference to the RRC_INACTIVE state, the present disclosure is not limited thereto. In some other embodiments, the inventive concept of the embodiments may also be applicable to data transmission in another state, e.g., the RRC_IDLE state.

For example, in LTE Rel-16, the feature Pre-configured Uplink Resources (PUR) was introduced for LTE-M and NB-IoT. In PUR, similar to Rel-17 CG-SDT, PUSCH resources may be preconfigured periodically in RRC_IDLE state for a UE to transmit periodic reports etc.

Therefore, states such as RRC_INACTIVE, RRC_IDLE may be collectively referred to as "non-connected" states and may comprise 3GPP-compliant states and/or similar states in other access technologies, such as, Wi-Fi, Bluetooth, WiMax, etc.

In NR Rel-17 SDT work item, two solutions are proposed for enabling SDT in the RRC_INACTIVE state: RACH-based SDT (i.e., transmitting small data on Message A PUSCH in a 2-step RACH procedure, or transmitting small data on Message 3 PUSCH in a 4-step RACH procedure) and Configured Grant (CG) based SDT (i.e., SDT over configured grant type-1 PUSCH resources for UEs in the RRC inactive state).

CG PUSCH resources are the PUSCH resources configured in advance for the UE. When there is uplink data available at UE's buffer, it may immediately start uplink transmission using the pre-configured PUSCH resources without waiting for an UL grant from the gNB, thus reducing the latency. NR supports CG type 1 PUSCH transmission and CG type 2 PUSCH transmission. For both two types, the PUSCH resources (time and frequency allocation, periodicity, etc.) are preconfigured via dedicated RRC signaling. The CG type 1 PUSCH transmission is activated/deactivated by RRC signaling, while the CG type 2 PUSCH transmission is activated/deactivated by an UL grant using downlink control information (DCI) signaling.

The CG period in NR R15 can be of following values depending on the CP configuration and the numerology:

| periodicity<br>Periodicity for UL transmission without UL grant for type 1 and type 2 (see TS 38.321 V16.3.0, clause 5.8.2).<br>The following periodicities are supported depending on the configured subcarrier spacing [symbols]: | |
|---|---|
| 15 kHz: | 2, 7, n*14, where n = {1, 2, 4, 5, 8, 10, 16, 20, 32, 40, 64, 80, 128, 160, 320, 640} |
| 30 kHz: | 2, 7, n*14, where n = {1, 2, 4, 5, 8, 10, 16, 20, 32, 40, 64, 80, 128, 160, 256, 320, 640, 1280} |
| 60 kHz with normal CP | 2, 7, n*14, where n = {1, 2, 4, 5, 8, 10, 16, 20, 32, 40, 64, 80, 128, 160, 256, 320, 512, 640, 1280, 2560} |
| 60 kHz with ECP: | 2, 6, n*12, where n = {1, 2, 4, 5, 8, 10, 16, 20, 32, 40, 64, 80, 128, 160, 256, 320, 512, 640, 1280, 2560} |
| 120 kHz: | 2, 7, n*14, where n = {1, 2, 4, 5, 8, 10, 16, 20, 32, 40, 64, 80, 128, 160, 256, 320, 512, 640, 1024, 1280, 2560, 5120} |

In NR Rel-16, a new parameter "periodicityExt-r16" has been introduced to calculate the periodicity for UL transmission without UL grant for type 1 and type 2 (see TS 38.331 V16.3.1, clause 6.3.2). If this field is present, the field "periodicity" is ignored. The following periodicities (in symbols) are supported depending on the configured subcarrier spacing and CP length:

| | |
|---|---|
| 15 kHz: | periodicityExt*14, where periodicityExt has a value between 1 and 640. |
| 30 kHz: | periodicityExt*14, where periodicityExt has a value between 1 and 1280. |
| 60 kHz with normal CP: | periodicityExt*14, where periodicityExt has a value between 1 and 2560. |
| 60 kHz with ECP: | periodicityExt*12, where periodicityExt has a value between 1 and 2560. |
| 120 kHz: | periodicityExt*14, where periodicityExt has a value between 1 and 5120. |

When PUSCH resource allocation is semi-statically configured by higher layer parameter configuredGrantConfig in BWP-UplinkDedicated information element, and the PUSCH transmission corresponding to a configured grant, the following higher layer parameters may be applied in the transmission:

For Type 1 PUSCH transmissions with a configured grant, the following parameters are given in configuredGrantConfig unless mentioned otherwise:

For the determination of the PUSCH repetition type, if the higher layer parameter pusch-RepTypeIndicator-r16 in rrc-ConfiguredUplinkGrant is configured and set to 'pusch-RepTypeB', PUSCH repetition type B is applied; otherwise, PUSCH repetition type A is applied;

For PUSCH repetition type A, the selection of the time domain resource allocation table follows the rules for DCI format 0_0 on UE specific search space, as defined in Clause 6.1.2.1.1 of 38.214 V16.4.0.

For PUSCH repetition type B, the selection of the time domain resource allocation table is as follows:

If pusch-RepTypeIndicatorForDCI-Format0-1-r16 in pusch-Config is configured and set to 'pusch-RepTypeB', PUSCH-TimeDomainResourceAllocationList-ForDCIformat0-1 in pusch-Config is used;

Otherwise, PUSCH-TimeDomainResourceAllocationList-ForDCIformat0-2 in pusch-Config is used.

It is not expected that pusch-RepTypeIndicator-r16 in rrc-ConfiguredUplinkGrant is configured with 'pusch-RepTypeB' when none of pusch-RepTypeIndicatorForDCI-Format0-1-r16 and pusch-RepTypeIndicatorForDCI-Format0-2-r16 in pusch-Config is set to 'pusch-RepTypeB'.

The higher layer parameter timeDomainAllocation value m provides a row index m+1 pointing to the determined time domain resource allocation table, where the start symbol and length are determined following the procedure defined in Clause 6.1.2.1 of 3GPP TS 38.214 V16.4.0;

Frequency domain resource allocation is determined by the N LSB bits in the higher layer parameter frequencyDomainAllocation, forming a bit sequence $f_{17}, \ldots, f_1, f_0$, where $f_0$ is the LSB, according to the procedure in Clause 6.1.2.2 of 38.214 V16.4.0 and N is determined as the size of frequency domain resource assignment field in DCI format 0-1 for a given resource allocation type indicated by resourceAllocation, except if useInterlacePUCCH-PUSCH in BWP-UplinkDedicated is configured, in which case uplink type 2 resource allocation is used wherein the UE interprets the LSB bits in the higher layer parameter frequencyDomainAllocation as for the frequency domain resource assignment field of DCI 0-1 according to the procedure in Clause 6.1.2.2.3 of TS 38.214 V16.4.0;

The $I_{MCS}$ is provided by higher layer parameter mcsAndTBS;

Number of DM-RS CDM groups, DM-RS ports, SRS resource indication and DM-RS sequence initialization are determined as in Clause 7.3.1.1.2 of TS 38.212 V16.4.0, and the antenna port value, the bit value for DM-RS sequence initialization, precoding information and number of layers, SRS resource indicator are provided by antennaPort, dmrs-SeqInitialization, precodingAndNumberOfLayers, and srs-ResourceIndicator respectively;

When frequency hopping is enabled, the frequency offset between two frequency hops can be configured by higher layer parameter frequencyHoppingOffset.

For Type 2 PUSCH transmissions with a configured grant: the resource allocation follows the higher layer configuration according to TS 38.321 V16.3.0, and UL grant received on the DCI.

The PUSCH repetition type and the time domain resource allocation table are determined by the PUSCH repetition type and the time domain resource allocation table associated with the UL grant received on the DCI, respectively, as defined in Clause 6.1.2.1 of 38.214 V16.4.0.

The 4-step RACH, 2-step RACH, and UL transmission of a configured grant type have already been specified as part of Rel-15 and Rel-16. Therefore, the SDT features to be specified in NR Rel-17 can build on these building blocks to enable small data transmission in RRC_INACTIVE state for NR.

Some embodiments of the present disclosure focus on the CG based SDT scheme. The following agreements were made in RAN2 for CG based SDT scheme:

The configuration of configured grant resource for UE uplink small data transfer is contained in the RRCRelease message. Configuration is only type 1 CG with no contention resolution procedure for CG.

The configuration of configured grant resource can include one type 1 CG configuration.

The configuration of configured grant resource for UE small data transmission is valid only in the same serving cell.

The UE can use configured grant based small data transfer if at least the following criteria is fulfilled (1) user data is smaller than the data volume threshold; (2) configured grant resource is configured and valid; (3) UE has valid timing advance (TA).

From RAN2 point of view: An association between CG resources and SSBs is required for CG-based SDT. FFS up to RAN1 how the association is configured or provided to the UE. Send a liaison statement (LS) to RAN1 to start the discussion on how the association can be made. Mention that one option RAN2 considered was explicit configuration with RRC Release message An SS-RSRP threshold is configured for SSB selection. UE selects one of the SSB with SS-RSRP above the threshold and selects the associated CG resource for UL data transmission.

Figure 2:
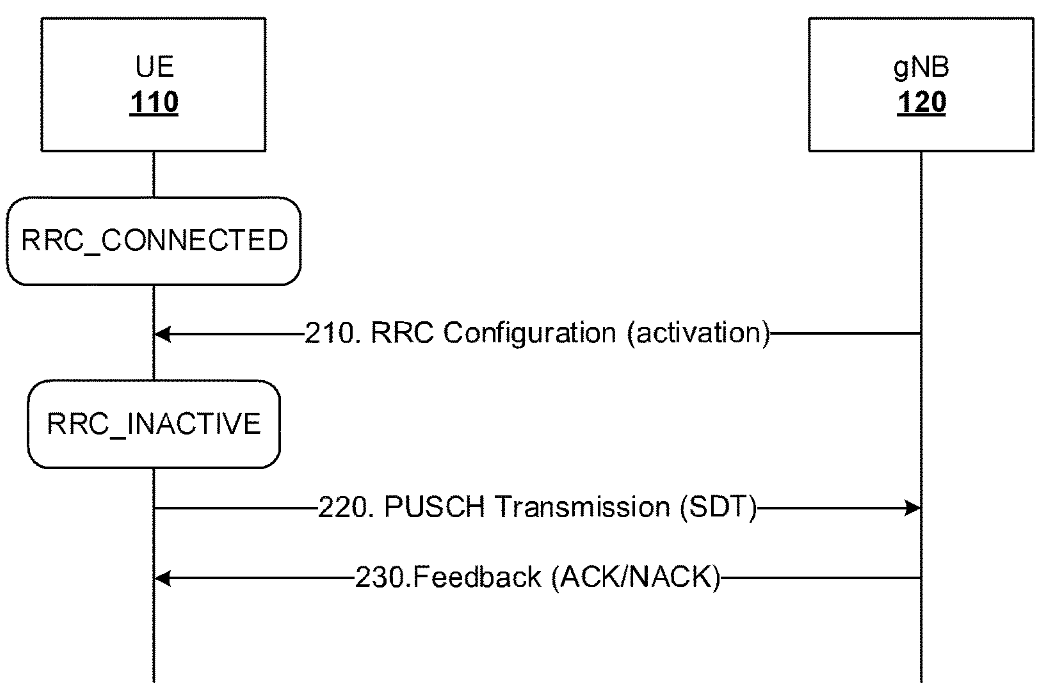
FIG. 2 is a diagram illustrating an exemplary CG-based SDT procedure and exemplary PUSCH resource configuration according to an embodiment of the present disclosure.
Figure 2:
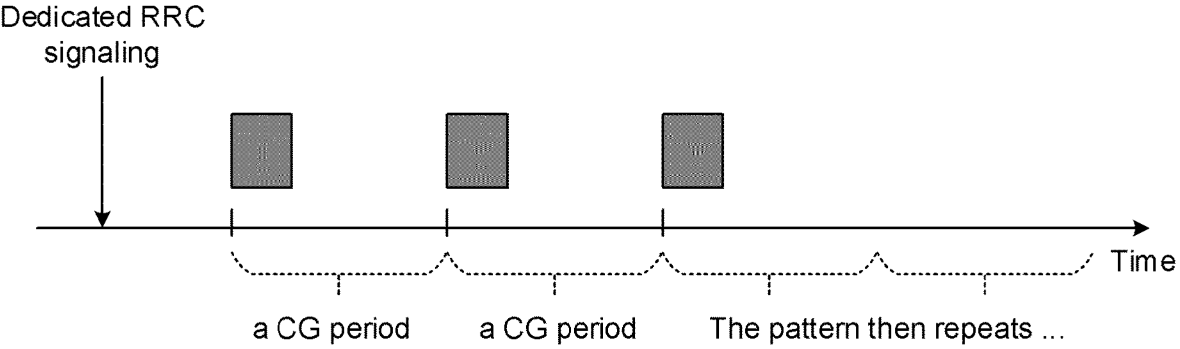

FIG. 2 is a diagram illustrating (a) an exemplary configured grant (CG)-based SDT procedure and (b) exemplary PUSCH resource configuration according to an embodiment of the present disclosure.

As shown in (a) of FIG. 2, the UE 110 may receive a semi-persistently assigned UL resource for SDT at step 210 when it is in the RRC_CONNECTED state. After transitioning to the RRC_INACTIVE state, the UE 110 may continue to use such UL resources for SDT. For example, the UE 110 may transmit its UL SDT data over the assigned semi-persistent radio resource to the gNB 120 in the RRC_INACTIVE state, and the gNB 120 may acknowledge the reception of the SDT data, for example, by an RRC Release message with a suspendConfig IE, to keep the UE 110 in the RRC_INACTIVE state.

Further, there are also RACH-based SDTs (e.g., 4-step RACH based SDT or 2-step RACH based SDT as mentioned above) which are not the focus in the present disclosure and therefore omitted for simplicity.

Referring to (b) of FIG. 2, for CG-based UL transmission, the PUSCH resources (time and frequency allocation, periodicity for UL transmission, etc.) may be preconfigured via dedicated RRC signaling, for example, an RRC release message which triggers the UE to transition into the RRC_INACTIVE or RRC_IDLE state.

No matter which of the SDT procedures is used, the UE 110 may conduct its SDT procedure without transitioning to the RRC_CONNECTED state and thus avoid the signaling overhead and reduce its power consumption. Further, although FIG. 2 shows the CG-based SDT procedure, it is merely a specific implementation of a SDT procedure, and the present disclosure is not limited thereto. For example, a different SDT procedure based on a different procedure may be adopted.

Figure 3:
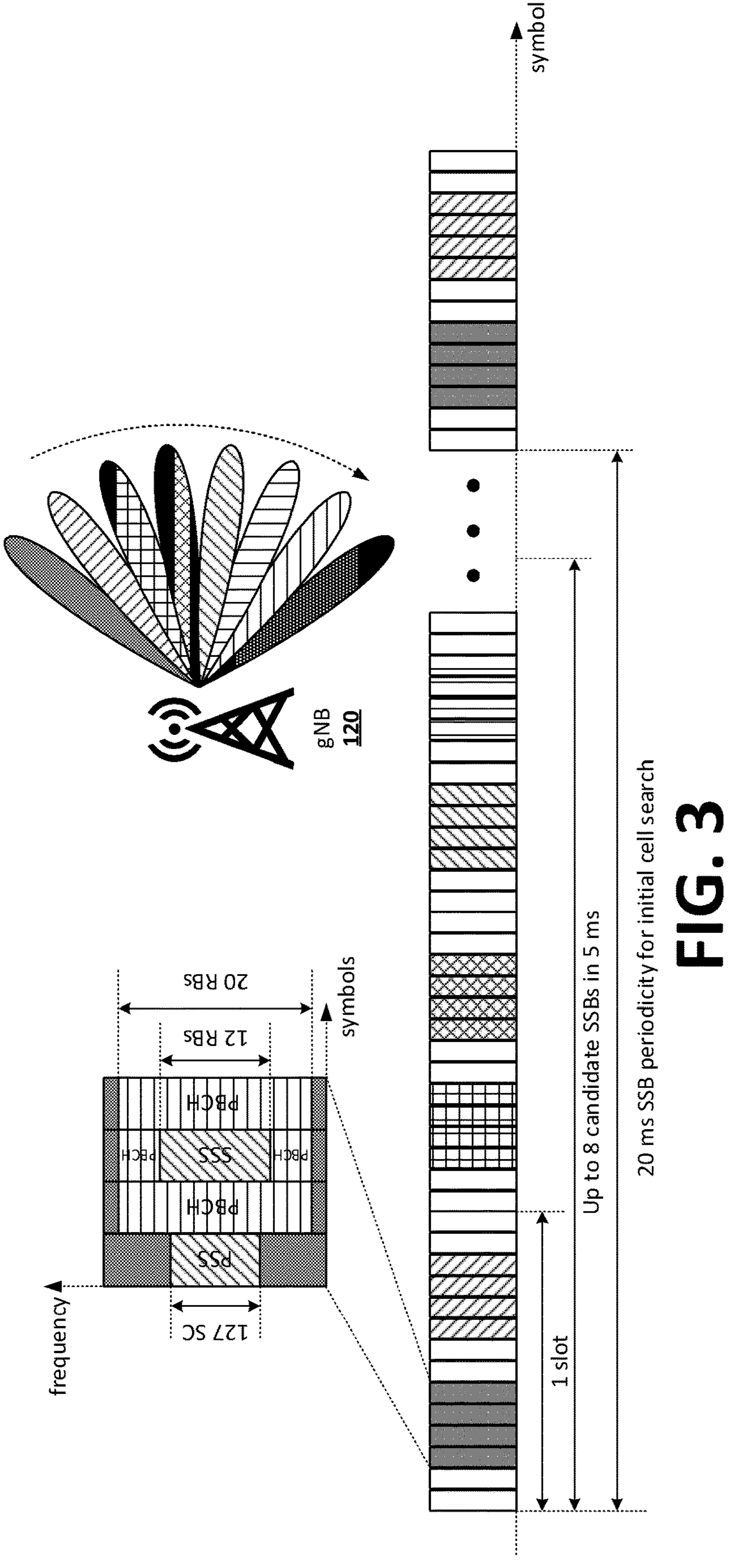
FIG. 3 is a diagram illustrating exemplary beams which may be transmitted by a gNB according to an embodiment of the present disclosure.

Further, in 5G NR, beamforming is an important feature for improving the coverage of synchronization signals (SSs) and physical broadcast channel (PBCH) block (referred to as SSB) transmission, especially for compensating the high path loss in high carrier frequency bands. To support beamforming and beam-sweeping for SSB transmission, in NR, a cell or gNB (e.g., the gNB 120 shown in FIG. 2) may transmit multiple SSBs in different narrow-beams in a time multiplexed fashion, for example, as shown in FIG. 3. The transmission of these SS/PBCH blocks may be confined to a half frame time interval (5 ms). FIG. 3 illustrates an example of SSB beam sweeping when the system is operating at frequency range 1 (FR 1).

In a 5G NR downlink frame, SS blocks or SSBs may be transmitted towards UEs at regular intervals based on periodicity set (e.g. 5/10/20/40/80/160 ms). Multiple SS blocks may be carried in a SS burst. As shown in FIG. 3, a single SS block may span 4 OFDM symbols on time axis and 240 subcarriers (or 20 resource blocks) on frequency axis. An SS block may carry PSS (Primary Synchronization Signal), SSS (Secondary Synchronization Signal) and Physical Broadcast Channel (PBCH) with Demodulation Reference Signal (DMRS). The SS blocks may be grouped into first 5 ms of the SS burst. The maximum number (L) of SS blocks in a single burst is frequency dependent. There can be about 64 blocks per burst at frequencies in frequency range 2 (i.e. mmwave frequencies in FR2). Following are the possible candidate SSB locations (L) within SS Burst set.

L=4 or L=8 for FR1

L=64 for FR2

Here DMRS associated with PBCH channel may be used to estimate RSRP (Reference Signal Received Power), which may be calculated from the received SS blocks at the UE.

As shown in FIG. 3, the gNB 120 may transmit multiple beams in different directions on which different SSBs may be carried, respectively, and a UE may detect one or more synchronous signals comprised in one or more of the SSBs to decode the data (e.g., MIB, SIB1, etc.) comprised therein. In this way, the UE may obtain any information necessary for communicating with the gNB 120, for example, transmission power control (TPC) related configurations as will described below.

Further, two transmission schemes may be supported for PUSCH: codebook based transmission and non-codebook based transmission. A UE may be configured with codebook based transmission when a higher layer parameter txConfig in pusch-Config is set to 'codebook', and the UE may be configured non-codebook based transmission when the higher layer parameter txConfig is set to 'nonCodebook'. If the higher layer parameter txConfig is not configured, the UE may not expected to be scheduled by DCI format 0_1 or 0_2. If PUSCH is scheduled by DCI format 0_0, the PUSCH transmission is based on a single antenna port. Except if the higher layer parameter enableDefaultBeamPL-For-PUSCH0-0 is set to 'enabled, the UE shall not expect PUSCH scheduled by DCI format 0-0 in a BWP without configured PUCCH resource with PUCCH-SpatialRelationInfo in frequency range 2 in the RRC connected state.

The linear power calculation of PUSCH in NR may be described as follows.

If a UE transmits a PUSCH on active UL BWP b of carrier f of serving cell c using parameter set configuration with index j and PUSCH power control adjustment state with index l, the UE may determine the PUSCH transmission power $P_{PUSCH,b,f,c}(i, j, q_d, l)$ in PUSCH transmission occasion i as $$P_{PUSCH,b,f,c}(i,j,q_d,l) = \min\left\{\begin{array}{l} P_{CMAX,f,c}(i), \\ P_{O\_PUSCH,b,f,c}(j) + 10\log_{10}\left(2^{\mu}\cdot M_{RB,b,f,c}^{PUSCH}(i)\right) + \alpha_{b,f,c}(j)\cdot \\ PL_{b,f,c}(q_d) + \Delta_{TF,b,f,c}(i) + f_{b,f,c}(i,l) \end{array}\right\}[dBm]$$

where, $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i, $P_{O\_PUSCHb,f,c}(j)$ is a parameter composed of the sum of a component $P_{O\_NOMINAL\_PUSCH,f,c}(j)$ and a component $P_{O\_UE\_PUSCH,b,f,c}(j)$ where $j\in\{0, 1, \ldots, J-1\}$.

If a UE established dedicated RRC connection using a Type-1 random access procedure, as described in Clause 8, and is not provided P0-PUSCH-AlphaSet or for a PUSCH (re)transmission corresponding to a RAR UL grant as described in Clause 8.3, $j=0$, $P_{O\_UE\_PUSCH,b,f,c}(0)=0$, and $P_{O\_NOMINAL\_PUSCH,f,c}(0)=P_{O\_PRE}+\Delta_{PREAMBLE\_Msg3}$, where $P_{O\_PRE}$ is provided by preambleReceivedTargetPower [11, TS 38.321] and $\Delta_{PREAMBLE\_Msg3}$ is provided by msg3-DeltaPreamble, or $\Delta_{PREAMBLE\_Msg3}=0$ dB if msg3-DeltaPreamble is not provided, for carrier f of serving cell c If a UE established dedicated RRC connection using a Type-2 random access procedure, as described in Clause 8, and is not provided P0-PUSCH-AlphaSet, or for a PUSCH transmission for Type-2 random access procedure as described in Clause 8.1A, $j=0$, $P_{O\_UE\_PUSCH,b,f,c}(0)=0$, and $P_{O\_NOMINAL\_PUSCH,f,c}(0)=P_{O\_PRE}+\Delta_{MsgA\_PUSCH}$, where $P_{O\_PRE}$ is provided by msgA-preambleReceivedTargetPower, or by preambleReceivedTargetPower if msgA-preambleReceivedTargetPower is not provided and $\Delta_{MsgA\_PUSCH}$ is provided by msgA-DeltaPreamble, or $\Delta_{MsgA\_PUSCH}=\Delta_{PREAMBLE\_Msg3}$ dB if msgA-DeltaPreamble is not provided, for carrier f of serving cell c For a PUSCH (re)transmission configured by ConfiguredGrantConfig, $j=1$, $P_{O\_NOMINAL\_PUSCH,f,c}(1)$ is provided by p0-NominalWithoutGrant, or $P_{O\_NOMINAL\_PUSCH,f,c}(1)=P_{O\_NOMINAL\_PUSCH,f,c}(0)$ if p0-NominalWithoutGrant is not provided, and $P_{O\_UE\_PUSCH,b,f,c}(1)$ is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of serving cell c For $j\in\{2, \ldots, J-1\}=S_J$, a $P_{O\_NOMINAL\_PUSCH,f,c}(j)$ value, applicable for all $j\in S_J$, is provided by p0-NominalWithGrant, or $P_{O\_NOMINAL\_PUSCH,f,c}(j)=P_{O\_NOMINAL\_PUSCH,f,c}(0)$ if p0-NominalWithGrant is not provided, for each carrier f of serving cell c and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c If the UE is provided by SRI-PUSCH-PowerControl more than one values of p0-PUSCH-AlphaSetId and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the value of $P_{O\_UE\_PUSCH,b,f,c}(j)$ from the p0-PUSCH-AlphaSetId value that is mapped to the SRI field value. If the DCI format also includes an open-loop power control parameter set indication field and a value of the open-loop power control parameter set indication field is '1', the UE determines a value Of $P_{O\_UE\_PUSCH,b,f,c}(j)$ from a first value in P0-PUSCH-Set with a p0-PUSCH-SetId value mapped to the SRI field value.

If the PUSCH transmission except for the PUSCH retransmission corresponding to a RAR UL grant is scheduled by a DCI format that does not include an SRI field, or if SRI-PUSCH-PowerControl is not provided to the UE, $j=2$, If P0-PUSCH-Set is provided to the UE and the DCI format includes an open-loop power control parameter set indication field, the UE determines a value of $P_{O\_UE\_PUSCH,b,f,c}(j)$ from a first P0-PUSCH-AlphaSet in p0-AlphaSets if a value of the open-loop power control parameter set indication field is '0' or '00' a first value in P0-PUSCH-Set with the lowest p0-PUSCH-SetID value if a value of the open-loop power control parameter set indication field is '1' or '01' a second value in P0-PUSCH-Set with the lowest p0-PUSCH-SetID value if a value of the open-loop power control parameter set indication field is '10' else, the UE determines $P_{O\_UE\_PUSCH,b,f,c}(j)$ from the value of the first P0-PUSCH-AlphaSet in p0-AlphaSets For $\alpha_{b,f,c}(j)$ For $j=0$, if $P_{O\_NOMINAL\_PUSCH,f,c}(0)=P_{O\_PRE}+\Delta_{MsgA\_PUSCH}$ and msgA-Alpha is provided, $\alpha_{b,f,c}(0)$ is the value of msgA-Alpha else if $P_{O\_NOMINAL\_PUSCH,f,c}(0)=P_{O\_PRE}+\Delta_{PREAMBLE\_Msg3}$ or msgA-Alpha is not provided, and msg3-Alpha is provided, $\alpha_{b,f,c}(0)$ is the value of msg3-Alpha else, $\alpha_{b,f,c}(0)=1$ For $j=1$, $\alpha_{b,f,c}(1)$ is provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell c For $j\in S_J$, a set of $\alpha_{b,f,c}(j)$ values are provided by a set of alpha in P0-PUSCH-AlphaSet indicated by a respective set of p0-PUSCH-AlphaSetId for active UL BWP b of carrier f of serving cell c If the UE is provided SRI-PUSCH-PowerControl and more than one values of p0-PUSCH-AlphaSetId, and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the values of $\alpha_{b,f,c}(j)$ from the p0-PUSCH-AlphaSetId value that is mapped to the SRI field value If the PUSCH transmission except for the PUSCH retransmission corresponding to a RAR UL grant is scheduled by a DCI format that does not include an SRI field, or if SRI-PUSCH-PowerControl is not provided to the UE, j=2, and the UE determines $\alpha_{b,f,c}(j)$ from the value of the first P0-PUSCH-AlphaSet in p0-AlphaSets $$M_{RB,b,f,c}^{PUSCH}(i)$$

is the bandwidth of the PUSCH resource assignment expressed in number of resource blocks for PUSCH transmission occasion i on active UL BWP b of carrier f of serving cell c and μ is a SCS configuration defined in [4, TS 38.211]

$PL_{b,f,c}(q_d)$ is a downlink pathloss estimate in dB calculated by the UE using reference signal (RS) index $q_d$ for the active DL BWP, as described in Clause 12, of carrier f of serving cell c If the UE is not provided PUSCH-PathlossReferenceRS and enableDefaultBeamPL-ForSRS, or before the UE is provided dedicated higher layer parameters, the UE calculates $PL_{b,f,c}(q_d)$ using a RS resource from an SS/PBCH block with same SS/PBCH block index as the one the UE uses to obtain MIB If the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The UE identifies a RS resource index $q_d$ in the set of RS resource indexes to correspond either to a SS/PBCH block index or to a CSI-RS resource index as provided by pusch-PathlossReferenceRS-Id in PUSCH-PathlossReferenceRS If the PUSCH transmission is scheduled by a RAR UL grant as described in Clause 8.3, or for a PUSCH transmission for Type-2 random access procedure as described in Clause 8.1A, the UE uses the same RS resource index $q_d$ as for a corresponding PRACH transmission If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field in a DCI format scheduling the PUSCH transmission and a set of PUSCH-PathlossReferenceRS-Id values and determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking If the PUSCH transmission is scheduled by DCI format 0-0, and if the UE is provided a spatial setting by PUCCH-SpatialRelationInfo for a PUCCH resource with a lowest index for active UL BWP b of each carrier f and serving cell c, as described in Clause 9.2.2, the UE uses the same RS resource index $q_d$ as for a PUCCH transmission in the PUCCH resource with the lowest index If the PUSCH transmission is not scheduled by DCI format 0-0, and if the UE is provided enableDefaultBeamPL-ForSRS and is not provided PUSCH-PathlossReferenceRS and PUSCH-PathlossReferenceRS-r16, the UE uses the same RS resource index $q_d$ as for an SRS resource set with an SRS resource associated with the PUSCH transmission If the PUSCH transmission is scheduled by DCI format 0-0 and the UE is not provided a spatial setting for a PUCCH transmission, or the PUSCH transmission is scheduled by DCI format 0-1 or DCI format 0-2 that does not include an SRI field, or SRI-PUSCH-PowerControl is not provided to the UE, the UE determines a RS resource index qa with a respective PUSCH-PathlossReferenceRS-Id value being equal to zero where the RS resource is either on serving cell c or, if provided, on a serving cell indicated by a value of pathlossReferenceLinking If the PUSCH transmission is scheduled by DCI format 0-0 on serving cell c, the UE is not provided PUCCH resources for the active UL BWP of serving cell c, and the UE is provided enableDefaultBeamPL-For-PUSCH0-0 the UE determines a RS resource index $q_d$ providing a periodic RS resource configured with qcl-Type set to 'typeD' in the TCI state or the QCL assumption of a CORESET with the lowest index in the active DL BWP of the serving cell c If the PUSCH transmission is scheduled by DCI format 0-0 on serving cell c, the UE is not provided a spatial setting for PUCCH resources on the active UL BWP of the primary cell [11, TS 38.321], and the UE is provided enableDefaultBeamPL-For-PUSCH0-0 the UE determines a RS resource index $q_d$ providing a periodic RS resource configured with qcl-Type set to 'typeD' in the TCI state or the QCL assumption of a CORESET with the lowest index in the active DL BWP of the serving cell c For a PUSCH transmission configured by ConfiguredGrantConfig, if rrc-ConfiguredUplinkGrant is included in ConfiguredGrantConfig, a RS resource index $q_d$ is provided by a value of pathlossReferenceIndex included in rrc-ConfiguredUplinkGrant where the RS resource is either on serving cell c or, if provided, on a serving cell indicated by a value of pathlossReferenceLinking For a PUSCH transmission configured by ConfiguredGrantConfig that does not include rrc-ConfiguredUplinkGrant, the UE determines a RS resource index $q_d$ from a value of PUSCH-PathlossReferenceRS-Id that is mapped to a SRI field value in a DCI format activating the PUSCH transmission. If the DCI format activating the PUSCH transmission does not include an SRI field, the UE determines a RS resource index $q_d$ with a respective PUSCH-PathlossReferenceRS-Id value being equal to zero where the RS resource is either on serving cell c or, if provided, on a serving cell indicated by a value of pathlossReferenceLinking If the UE is provided enablePL-RS-UpdateForPUSCH-SRS, a mapping between sri-PUSCH-PowerControlId and PUSCH-PathlossReferenceRS-Id values can be updated by a MAC CE as described in [11, TS38.321]

For a PUSCH transmission scheduled by a DCI format that does not include an SRI field, or for a PUSCH transmission configured by ConfiguredGrantConfig and activated, as described in Clause 10.2, by a DCI format that does not include an SRI field, a RS resource index $q_d$ is determined from the PUSCH-PathlossReferenceRS-Id mapped to sri-PUSCH-PowerControlId=0

$PL_{b,f,c}(q_d)$=referenceSignalPower-higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-BlockPower. If the UE is configured periodic CSI-RS reception, referenceSignalPower is provided either by ss-PBCH-BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

$$\Delta_{TF,b,f,c}(i) = 10\log_{10}\left(\left(2^{BPRBK_s} - 1\right)\cdot\beta_{offset}^{PUSCH}\right)$$

for $K_s$=1.25 and $\Delta_{TF,b,f,c}$(i)=0 for $K_s$=0 where $K_s$ is provided by deltaMCS for each UL BWP b of each carrier f and serving cell c. If the PUSCH transmission is over more than one layer [6, TS 38.214], $\Delta_{TF,b,f,c}$(i)=0, BPRE and $$\beta_{offset}^{PUSCH},$$

for active UL BWP b of each carrier f and each serving cell c, are computed as below $$BPRE = \sum_{r=0}^{C-1} K_r / N_{RE}$$

for PUSCH with UL-SCH data and $$BPRE = Q_m \cdot R / \beta_{offset}^{PUSCH}$$

for CSI transmission in a PUSCH without UL-SCH data, where c is a number of transmitted code blocks, $K_r$ is a size for code block r, and $N_{RE}$ is a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j),$$

where $$N_{symb,b,f,c}^{PUSCH}(i)$$

is a number of symbols for PUSCH transmission occasion i on active UL BWP b of carrier f of serving cell c, $$N_{sc,data}^{RB}(i, j)$$

is a number of subcarriers excluding DM-RS subcarriers and phase-tracking RS samples [4, TS 38.211] in PUSCH symbol j and assuming no segmentation for a nominal repetition in case the PUSCH transmission is with repetition Type B, $$0 \le j < N_{symb,b,f,c}^{PUSCH}(i),$$

and c, $K_r$ are defined in [5, TS 38.212]

$$\beta_{offset}^{PUSCH} = 1$$

when the PUSCH includes UL-SCH data and $$\beta_{offset}^{PUSCH} = \beta_{offset}^{CSI,1},$$

as described in Clause 9.3, when the PUSCH includes CSI and does not include UL-SCH data $Q_m$ is the modulation order and R is the target code rate, as described in [6, TS 38.214], provided by the DCI format scheduling the PUSCH transmission that includes CSI and does not include UL-SCH data For the PUSCH power control adjustment state $f_{b,f,c}$(i, l) for active UL BWP b of carrier f of serving cell c in PUSCH transmission occasion i $\delta_{PUSCH,b,f,c}$(i, l) is a TPC command value included in a DCI format that schedules the PUSCH transmission occasion i on active UL BWP b of carrier f of serving cell c or jointly coded with other TPC commands in a DCI format 2-2 with CRC scrambled by TPC-PUSCH-RNTI, as described in Clause 11.3 l∈{0, 1} if the UE is configured with twoPUSCH-PC-AdjustmentStates and l=0 if the UE is not configured with twoPUSCH-PC-AdjustmentStates or if the PUSCH transmission is scheduled by a RAR UL grant as described in Clause 8.3

For a PUSCH (re)transmission configured by ConfiguredGrantConfig, the value of l∈{0, 1} is provided to the UE by powerControlLoopToUse If the UE is provided SRI-PUSCH-PowerControl, the UE obtains a mapping between a set of values for the SRI field in a DCI format scheduling the PUSCH transmission and the l value(s) provided by sri-PUSCH-ClosedLoop-Index and determines the l value that is mapped to the SRI field value If the PUSCH transmission is scheduled by a DCI format that does not include an SRI field, or if an SRI-PUSCH-PowerControl is not provided to the UE, l=0

If the UE obtains one TPC command from a DCI format 2-2 with CRC scrambled by a TPC-PUSCH-RNTI, the l value is provided by the closed loop indicator field in DCI format 2-2

$$f_{b,f,c}(i,l)=f_{b,f,c}(i-i_0,l)+\sum_{m=0}^{C(D_i)-1}\delta_{PUSCH,b,f,c}(m,l)$$

is the PUSCH power control adjustment state l for active UL BWP b of carrier f of serving cell c and PUSCH transmission occasion i if the UE is not provided tpc-Accumulation, where The $\delta_{PUSCH,b,f,c}$ values are given in Table 7.1.1-1

$$\sum_{m=0}^{C(D_i)-1}\delta_{PUSCH,b,f,c}(m,l)$$

is a sum of TPC command values in a set $D_i$ of TPC command values with cardinality $C(D_i)$ that the UE receives between $K_{PUSCH}(i-i_0)-1$ symbols before PUSCH transmission occasion $i-i_0$ and PUSCH (i) symbols before PUSCH transmission occasion i on active UL BWP b of carrier f of serving cell c for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}$ (i) symbols before PUSCH transmission occasion i If a PUSCH transmission is scheduled by a DCI format, $K_{PUSCH}(i)$ is a number of symbols for active UL BWP b of carrier f of serving cell c after a last symbol of a corresponding PDCCH reception and before a first symbol of the PUSCH transmission If a PUSCH transmission is configured by ConfiguredGrantConfig, $K_{PUSCH}(i)$ is a number of $K_{PUSCH,min}$ symbols equal to the product of a number of symbols per slot, $$N_{symb}^{slot},$$

and the minimum of the values provided by k2 in PUSCH-ConfigCommon for active UL BWP b of carrier f of serving cell c If the UE has reached maximum power for active UL $BWP^b$ of carrier f of serving cell c at PUSCH transmission occasion $i-i_0$ and $$\sum_{m=0}^{C(D_i)-1}\delta_{PUSCH,b,f,c}(m,l)\geq 0,$$

then $f_{b,f,c}(i,l)=f_{b,f,c}(i-i_0,l)$

If UE has reached minimum power for active UL $BWP^b$ of carrier f of serving cell c at PUSCH transmission occasion $i-i_0$ and $$\sum_{m=0}^{C(D_i)-1}\delta_{PUSCH,b,f,c}(m,l)\leq 0,$$

then $f_{b,f,c}(i,l)=f_{b,f,c}(i-i_0,l)$

A UE resets accumulation of a PUSCH power control adjustment state l for active UL BWP b of carrier f of serving cell c to $f_{b,f,c}(k,l)=0$, $k=0, 1, \ldots, i$ If a configuration for a corresponding value $P_{O\_UE\_PUSCH,b,f,c}(j)$ value is provided by higher layers If a configuration for a corresponding $\alpha_{b,f,c}(j)$ value is provided by higher layers where l is determined from the value of j as If j>1 and the UE is provided higher SRI-PUSCH-PowerControl, l is the sri-PUSCH-ClosedLoopIndex value(s) configured in any SRI-PUSCH-PowerControl with the sri-P0-PUSCH-AlphaSetId value corresponding to j If j>1 and the UE is not provided SRI-PUSCH-PowerControl or j=0, l=0

If j=1, l is provided by the value of powerControlLoopToUse $f_{b,f,c}(i,l)=\delta_{PUSCH,b,f,c}(i,l)$ is the PUSCH power control adjustment state for active UL BWP b of carrier f of serving cell c and PUSCH transmission occasion i if the UE is provided tpc-Accumulation, where $\delta_{PUSCH,b,f,c}$ absolute values are given in Table 7.1.1-1

If the UE receives a random access response message in response to a PRACH transmission or a MsgA transmission on active UL BWP b of carrier f of serving cell c as described in Clause 8

$f_{b,f,c}(0,l)=\Delta P_{rampup,b,f,c}+\delta_{msg2,b,f,c}$, where l=0 and $\delta_{msg2,b,f,c}$ is a TPC command value indicated in a random access response grant of the random access response message corresponding to a PRACH transmission according to Type-1 random access procedure, or in a random access response grant of the random access response message corresponding to a MsgA transmission according to Type-2 random access procedure with RAR message(s) for fallbackRAR, on active UL BWP b of carrier f in the serving cell c, and $$\Delta P_{rampup,b,f,c}=\min\left[\left\{\max\left(0,P_{CMAX,f,c}-\left(\begin{array}{c}10\log_{10}\left(2^{\mu}\cdot M_{RB,b,f,c}^{PUSCH}(0)\right)+\\P_{O\_PUSCH,b,f,c}(0)+\alpha_{b,f,c}(0)\cdot PL_c+\\\Delta_{TF,b,f,c}(0)+\delta_{msg2,b,f,c}\end{array}\right)\right)\right\}\right],$$

-continued $$\left.\Delta P_{rampuprequested,b,f,c}\right]$$

and $\Delta P_{rampuprequested,b,f,c}$ is provided by higher layers and corresponds to the total power ramp-up requested by higher layers from the first to the last random access preamble for carrier f in the serving cell c, $$M_{RB,b,f,c}^{PUSCH}(0)$$

is the bandwidth of the PUSCH resource assignment expressed in number of resource blocks for the first PUSCH transmission on active UL BWP b of carrier f of serving cell c, and $\Delta_{TF,b,f,c}(0)$ is the power adjustment of first PUSCH transmission on active UL BWP b of carrier f of serving cell c.

If the UE transmits the PUSCH in PUSCH transmission occasion i on active UL BWP b of carrier f of serving cell c as described in Clause 8.1A, $f_{b,f,c}(0, l)=\Delta P_{rampup,b,f,c}$, where l=0, and $$\Delta P_{rampup,b,f,c} = \min\left[\left\{\max\left(0, P_{CMAX,f,c} - \left(\begin{array}{c}10\log_{10}\left(2^{\mu}\cdot M_{RB,b,f,c}^{PUSCH}(i)\right) + \\ P_{O\_PUSCH,b,f,c}(0) + \alpha_{b,f,c}(0)\cdot PL_c(i) + \\ \Delta_{TF,b,f,c}(i)\end{array}\right)\right)\right\}, \Delta P_{rampuprequested,b,f,c}\right]$$

and $\Delta P_{rampuprequested,b,f,c}$ is provided by higher layers and corresponds to the total power ramp-up requested by higher layers, $$M_{RB,b,f,c}^{PUSCH}(i)$$

is the bandwidth of the PUSCH resource assignment expressed in number of resource blocks, and $\Delta_{TF,b,f,c}(i)$ is the power adjustment of the PUSCH transmission in PUSCH transmission occasion i.

Table 7.1.1-1: Mapping of TPC Command Field in a DCI Format Scheduling a PUSCH Transmission, or in DCI Format 2-2 with CRC Scrambled by TPC-PUSCH-RNTI, or in DCI Format 2_3, to Absolute and Accumulated $\delta_{PUSCH,b,f,c}$ Values or $\delta_{SRS,b,f,c}$ Values

| TPC Command Field | Accumulated $\delta_{PUSCH,b,f,c}$ or $\delta_{SRS,b,f,c}$ [dB] | Accumulated $\delta_{PUSCH,b,f,c}$ or $\delta_{SRS,b,f,c}$ [dB] |
|---|---|---|
| 0 | −1 | −4 |
| 1 | 0 | −1 |
| 2 | 1 | 1 |
| 3 | 3 | 4 |

As described above, for a PUSCH transmission on active UL BWP b of carrier f of serving cell c, a UE may first calculate a linear value $\hat{P}_{PUSCH,b,f,c}(i, j, q_d, l)$ of the transmit power $P_{PUSCH,b,f,c}(i, j, q_d, l)$, with parameters as defined. For a PUSCH transmission scheduled by a DCI format other than DCI format 0-0, or configured by ConfiguredGrant-Config or semiPersistentOnPUSCH, if txConfig in PUSCH-Config is set to 'codebook', a scaling factor s may be further used to scale the calculated $\hat{P}_{PUSCH,b,f,c}(i, j, q_d, l)$. Following text are rules about the scaling copied from section 7.1 of 3GPP TS 38.213 V16.4.0.

If ul-FullPowerTransmission in PUSCH-Config is provided, the UE scales $\hat{P}_{PUSCH,b,f,c}(i, j, q_d, l)$ by s where:

if ul-FullPowerTransmission in PUSCH-Config is set to fullpowerMode1, and each SRS resource in the SRS-ResourceSet with usage set to 'codebook' has more than one SRS port, s is the ratio of a number of antenna ports with non-zero PUSCH transmission power over the maximum number of SRS ports supported by the UE in one SRS resource if ul-FullPowerTransmission in PUSCH-Config is set to fullpowerMode2, s=1 for full power TPMIs reported by the UE [16, TS 38.306], and s is the ratio of a number of antenna ports with non-zero PUSCH transmission power over a number of SRS ports for remaining TPMIs, where the number of SRS ports is associated with an SRS resource indicated by an SRI field in a DCI format scheduling the PUSCH transmission if more than one SRS resource is configured in the SRS-ResourceSet with usage set to 'codebook', or indicated by Type 1 configured grant, or the number of SRS ports is associated with the SRS resource if only one SRS resource is configured in the SRS-ResourceSet with usage set to 'codebook', s=1, if an SRS resource with a single port is indicated by an SRI field in a DCI format scheduling the PUSCH transmission when more than one SRS resource is provided in the SRS-ResourceSet with usage set to 'codebook', or indicated by Type 1 configured grant, or if only one SRS resource with a single port is provided in the SRS-ResourceSet with usage set to 'codebook', and if ul-FullPowerTransmission in PUSCH-Config is set to fullpower, s=1 else, if each SRS resource in the SRS-ResourceSet with usage set to 'codebook' has more than one SRS port, the UE scales the linear value by the ratio of the number of antenna ports with a non-zero PUSCH transmission power to the maximum number of SRS ports supported by the UE in one SRS resource.

Further, in NR release 15 and 16, for PUSCH transmission when dedicated signalling PUSCH-Config is available, the power control related parameters are provided in PUSCH-PowerControl IE shown in table below. Before dedicated signalling is available, some of the parameters are just predetermined.

The IE PUSCH-PowerControl is used to configure UE specific power control parameter for PUSCH.

PUSCH-PowerControl information element

```
-- ASN1START
-- TAG-PUSCH-POWERCONTROL-START
PUSCH-PowerControl ::=                SEQUENCE {
  tpc-Accumulation                      ENUMERATED { disabled }
OPTIONAL, -- Need S
  msg3-Alpha                            Alpha
OPTIONAL, -- Need S
  p0-NominalWithoutGrant                INTEGER (−202..24)
OPTIONAL, -- Need M
  p0-AlphaSets                          SEQUENCE (SIZE (1..maxNrofP0-PUSCH-AlphaSets)) OF P0-
PUSCH-AlphaSet              OPTIONAL, -- Need M
  pathlossReferenceRSToAddModList       SEQUENCE (SIZE (1..maxNrofPUSCH-PathlossReferenceRSs)) OF
PUSCH-PathlossReferenceRS
OPTIONAL, -- Need N
  pathlossReferenceRSToReleaseList      SEQUENCE (SIZE (1..maxNrofPUSCH-PathlossReferenceRSs)) OF
PUSCH-PathlossReferenceRS-Id
OPTIONAL,   -- Need N
  twoPUSCH-PC-AdjustmentStates          ENUMERATED {twoStates}
OPTIONAL, -- Need S
  deltaMCS                              ENUMERATED {enabled}
OPTIONAL, -- Need S
  sri-PUSCH-MappingToAddModList         SEQUENCE (SIZE (1..maxNrofSRI-PUSCH-Mappings)) OF SRI-
PUSCH-PowerControl
OPTIONAL, -- Need N
  sri-PUSCH-MappingToReleaseList        SEQUENCE (SIZE (1..maxNrofSRI-PUSCH-Mappings)) OF SRI-
PUSCH-PowerControlId
OPTIONAL  -- Need N
  }
P0-PUSCH-AlphaSet ::=                 SEQUENCE {
  p0-PUSCH-AlphaSetId                   P0-PUSCH-AlphaSetId,
  p0                                    INTEGER (−16..15)
OPTIONAL, -- Need S
  alpha                                 Alpha
OPTIONAL  -- Need S
}
P0-PUSCH-AlphaSetId ::=               INTEGER (0..maxNrofP0-PUSCH-AlphaSets-1)
PUSCH-PathlossReferenceRS ::=         SEQUENCE {
  pusch-PathlossReferenceRS-Id          PUSCH-PathlossReferenceRS-Id,
  referenceSignal                       CHOICE {
    ssb-Index                             SSB-Index,
    csi-RS-Index                          NZP-CSI-RS-ResourceId
  }
}
PUSCH-PathlossReferenceRS-r16 ::=     SEQUENCE {
  pusch-PathlossReferenceRS-Id-r16      PUSCH-PathlossReferenceRS-Id-v1610,
  referenceSignal-r16                   CHOICE {
    ssb-Index-r16                         SSB-Index,
    csi-RS-Index-r16                      NZP-CSI-RS-ResourceId
  }
}
PUSCH-PathlossReferenceRS-Id ::=      INTEGER (0..maxNrofPUSCH-PathlossReferenceRSs-1)
PUSCH-PathlossReferenceRS-Id-v1610 ::= INTEGER (maxNrofPUSCH-PathlossReferenceRSs..maxNrofPUSCH-
PathlossReferenceRSs-1-r16)
SRI-PUSCH-PowerControl ::=            SEQUENCE {
  sri-PUSCH-PowerControlId              SRI-PUSCH-PowerControlId,
  sri-PUSCH-PathlossReferenceRS-Id      PUSCH-PathlossReferenceRS-Id,
  sri-P0-PUSCH-AlphaSetId               P0-PUSCH-AlphaSetId,
  sri-PUSCH-ClosedLoopIndex             ENUMERATED { i0, i1 }
}
SRI-PUSCH-PowerControlId ::=          INTEGER (0..maxNrofSRI-PUSCH-Mappings-1)
PUSCH-PowerControl-v1610 ::=          SEQUENCE {
  pathlossReferenceRSToAddModList2-r16   SEQUENCE (SIZE (1..maxNrofPUSCH-
PathlossReferenceRSsDiff-r16)) OF PUSCH-PathlossReferenceRS-r16
OPTIONAL, -- Need N
  pathlossReferenceRSToReleaseList2-r16 SEQUENCE (SIZE (1..maxNrofPUSCH-
PathlossReferenceRSsDiff-r16)) OF PUSCH-PathlossReferenceRS-Id-v1610
OPTIONAL, -- Need N
  p0-PUSCH-SetList-r16                  SEQUENCE (SIZE (1..maxNrofSRI-PUSCH-Mappings)) of P0-
PUSCH-Set-r16               OPTIONAL, -- Need R
  olpc-ParameterSet                     SEQUENCE {
    olpc-ParameterSetDCI-0-1-r16          INTEGER (1..2)
OPTIONAL, -- Need R
```

-continued

PUSCH-PowerControl information element

```
  olpc-ParameterSetDCI-0-2-r16              INTEGER (1..2)
OPTIONAL  -- Need R
  }
OPTIONAL, -- Need M
  ...
}
P0-PUSCH-Set-r16 ::=                    SEQUENCE {
  p0-PUSCH-SetId-r16                      P0-PUSCH-SetId-r16,
  p0-List-r16                             SEQUENCE (SIZE (1..maxNrofP0-PUSCH-Set-r16)) OF P0-PUSCH-
r16                          OPTIONAL, -- Need R
  ...
}
P0-PUSCH-SetId-r16 ::=                  INTEGER (0..maxNrofSRI-PUSCH-Mappings-1)
P0-PUSCH-r16 ::=                        INTEGER (−16..15)
-- TAG-PUSCH-POWERCONTROL-STOP
-- ASN1STOP
```

For PUSCH configured by CG configured grant, some of the parameters for CG PUSCH power control are provided in the ConfiguredGrantConfig IE:

ConfiguredGrantConfig information element

```
-- ASN1START
-- TAG-CONFIGUREDGRANTCONFIG-START
ConfiguredGrantConfig ::=                     SEQUENCE {
  frequencyHopping                              ENUMERATED {intraSlot, interSlot}
OPTIONAL, -- Need S
  cg-DMRS-Configuration                         DMRS-UplinkConfig,
  mcs-Table                                     ENUMERATED {qam256, qam64LowSE}
OPTIONAL, -- Need S
  mcs-TableTransformPrecoder                    ENUMERATED {qam256, qam64LowSE}
OPTIONAL, -- Need S
  uci-On PUSCH                                  SetupRelease { CG-UCI-OnPUSCH }
OPTIONAL, -- Need M
  resourceAllocation                            ENUMERATED { resourceAllocationType0,
resourceAllocationType1, dynamicSwitch },
  rbg-Size                                      ENUMERATED {config2}
OPTIONAL, -- Need S
  powerControlLoopToUse                         ENUMERATED {n0, n1},
  p0-PUSCH-Alpha                                P0-PUSCH-AlphaSetId,
  transformPrecoder                             ENUMERATED {enabled, disabled}
OPTIONAL, -- Need S
  nrofHARQ-Processes                            INTEGER (1..16),
  repK                                          ENUMERATED {n1, n2, n4, n8},
  repK-RV                                       ENUMERATED {s1-0231, s2-0303, s3-0000}
OPTIONAL, -- Need R
  periodicity                                   ENUMERATED {
                                                    sym2, sym7, sym1x14, sym2x14, sym4x14, sym5x14,
sym8x14, sym10x14, sym16x14, sym20x14,
                                                    sym32x14, sym40x14, sym64x14, sym80x14,
sym128x14, sym160x14, sym256x14, sym320x14, sym512x14,
                                                    sym640x14, sym1024x14, sym1280x14, sym2560x14,
sym5120x14,
                                                    sym6, sym1x12, sym2x12, sym4x12, sym5x12,
sym8x12, sym10x12, sym16x12, sym20x12, sym32x12,
                                                    sym40x12, sym64x12, sym80x12, sym128x12,
sym160x12, sym256x12, sym320x12, sym512x12, sym640x12,
                                                    sym1280x12, sym2560x12
  },
  configuredGrantTimer                          INTEGER (1..64)
OPTIONAL, -- Need R
  rrc-ConfiguredUplinkGrant                     SEQUENCE {
    timeDomainOffset                              INTEGER (0..5119),
    timeDomainAllocation                          INTEGER (0..15),
    frequencyDomainAllocation                     BIT STRING (SIZE(18)),
    antennaPort                                   INTEGER (0..31),
    dmrs-SeqInitialization                        INTEGER (0..1)
OPTIONAL, -- Need R
    precodingAndNumberOfLayers                    INTEGER (0..63) ,
    srs-ResourceIndicator                         INTEGER (0..15)
OPTIONAL, -- Need R
    mcsAndTBS                                     INTEGER (0..31),
```

-continued

```
ConfiguredGrantConfig information element

      frequencyHoppingOffset                   INTEGER (1.. maxNrofPhysicalResourceBlocks-1)
OPTIONAL, -- Need R
      pathlossReferenceIndex                   INTEGER (0..maxNrofPUSCH-PathlossReferenceRSs-1) ,
      ...,
      [[
      pusch-RepTypeIndicator-r16               ENUMERATED {pusch-RepTypeA, pusch-RepTypeB}
OPTIONAL, -- Need M
      frequencyHoppingPUSCH-RepTypeB-r16       ENUMERATED {interRepetition, interSlot}
OPTIONAL, -- Cond RepTypeB
      timeReferenceSFN-r16                     ENUMERATED {sfn512}
OPTIONAL  -- Need S
      ]]
   }
OPTIONAL, -- Need R
   ...,
   [[
   cg-RetransmissionTimer-r16                  INTEGER (1..64)
OPTIONAL, -- Need R
   cg-minDFI-Delay-r16                         ENUMERATED
                                                 {sym7, sym1x14, sym2x14, sym3x14, sym4x14,
sym5x14, sym6x14, sym7x14, sym8x14,
                                                 sym9x14, sym10x14, sym11x14, sym12x14,
sym13x14, sym14x14, sym15x14, sym16x14
                                                 }
OPTIONAL, -- Need R
   cg-nrofPUSCH-InSlot-r16                     INTEGER (1..7)
OPTIONAL, -- Need R
   cg-nrofSlots-r16                            INTEGER (1..40)
OPTIONAL, -- Need R
   cg-StartingOffsets-r16                      CG-StartingOffsets-r16
OPTIONAL, -- Need R
   cg-UCI-Multiplexing-r16                     ENUMERATED {enabled}
OPTIONAL, -- Need R
   cg-COT-SharingOffset-r16                    INTEGER (1..39)
OPTIONAL, -- Need R
   betaOffsetCG-UCI-r16                        INTEGER (0..31)
OPTIONAL, -- Need R
   cg-COT-SharingList-r16                      SEQUENCE (SIZE (1..1709)) OF CG-COT-Sharing-r16
OPTIONAL, -- Need R
   harq-ProcID-Offset-r16                      INTEGER (0..15)
OPTIONAL, -- Need M
   harq-ProcID-Offset2-r16                     INTEGER (0..15)
OPTIONAL, -- Need M
   configuredGrantConfigIndex-r16              ConfiguredGrantConfigIndex-r16
OPTIONAL, -- Cond CG-List
   configuredGrantConfigIndexMAC-r16           ConfiguredGrantConfigIndexMAC-r16
OPTIONAL, -- Cond CG-IndexMAC
   periodicityExt-r16                          INTEGER (1..5120)
OPTIONAL, -- Need R
   startingFromRV0-r16                         ENUMERATED {on, off}
OPTIONAL, -- Need R
   phy-PriorityIndex-r16                       ENUMERATED {p0, p1}
OPTIONAL, -- Need R
   autonomousTx-r16                            ENUMERATED {enabled}
OPTIONAL  -- Cond LCH-BasedPrioritization
   ]]
}
CG-UCI-OnPUSCH ::= CHOICE {
   dynamic                                     SEQUENCE (SIZE (1..4)) OF BetaOffsets,
   semiStatic                                  BetaOffsets
}
CG-COT-Sharing-r16 ::= CHOICE {
   noCOT-Sharing-r16                       NULL,
   cot-Sharing-r16                         SEQUENCE {
      duration-r16                             INTEGER (1..39),
      offset-r16                               INTEGER (1..39),
      channelAccessPriority-r16                INTEGER (1..4)
   }
}
CG-StartingOffsets-r16 ::= SEQUENCE {
   cg-StartingFullBW-InsideCOT-r16             SEQUENCE (SIZE (1..7)) OF INTEGER (0..6)
OPTIONAL, -- Need R
   cg-StartingFullBW-OutsideCOT-r16            SEQUENCE (SIZE (1..7)) OF INTEGER (0..6)
OPTIONAL, -- Need R
   cg-StartingPartialBW-InsideCOT-r16          INTEGER (0..6)
OPTIONAL, -- Need R
```

-continued

| ConfiguredGrantConfig information element | |
|---|---|
| cg-StartingPartialBW-OutsideCOT-r16 | INTEGER (0..6) |
| OPTIONAL -- Need R | |
| } | |
| -- TAG-CONFIGUREDGRANTCONFIG-STOP | |
| -- ASN1STOP | |

For RACH-based SDT, a UE may detect one good enough SSB beam, select a random-access preamble in the set of one or more preambles mapped to this SSB for the random access, and then when the gNB detects the preamble, the good enough SSB beam for this UE is known indirectly at the gNB so that good beams can be used for transmitting signals to or receiving signals from this UE.

For CG-based SDT, the RACH procedure is skipped. After selecting an SSB, the UE will transmit its small data on CG PUSCH resource(s) that is pre-configured for its SDT. Therefore, an association between CG PUSCH resource(s) and SSB(s) may be required for CG-based SDT to achieve the beam alignment between the UE and the gNB.

In NR Rel-15 and Rel-16, PUSCH is not associated with SSB for PUSCH resource selection, and the power control of the PUSCH is not associated to the PUSCH resource selection. However, for CG PUSCH in SDT, the resource selection may be associated to SSB, and when the selected SSB index is changed, it is not determined yet whether the power control of PUSCH should be suspended or whether the reference signal for pathloss estimation should be changed.

Further, in Rel-15 and Rel-16, most of the parameters for power control of a PUSCH is determined by dedicated RRC signalling when UE is in the RRC connected state before the UE enters the RRC INACTIVE/IDLE state. Therefore, it is not determined yet whether the UE should reuse the configurations before UE switches to the RRC INACTIVE/IDLE state or have SDT specific parameters separately configured.

Therefore, in some embodiments of the present disclosure, methods on power control of CG PUSCH for a UE to transmit uplink small data in the RRC inactive or idle state is proposed. In some embodiments, a method may involve power control of CG PUSCH based on SSB beam selection for CG PUSCH resource determination. Further, another method may involve CG PUSCH power control configuration in the RRC INACTIVE/IDLE state.

These methods may improve the power utilization efficiency of UE when doing SDT in the RRC INACTIVE/IDLE state, especially when multi-beam operation for CG-based SDT is supported for robust PUSCH transmissions.

In some embodiments, the reference signal (RS) for pathloss estimation may be the DL RS associated with the CG PUSCH transmission. In some embodiments, the DL RS may be an SSB selected for CG PUSCH resource determination.

Figure 4:
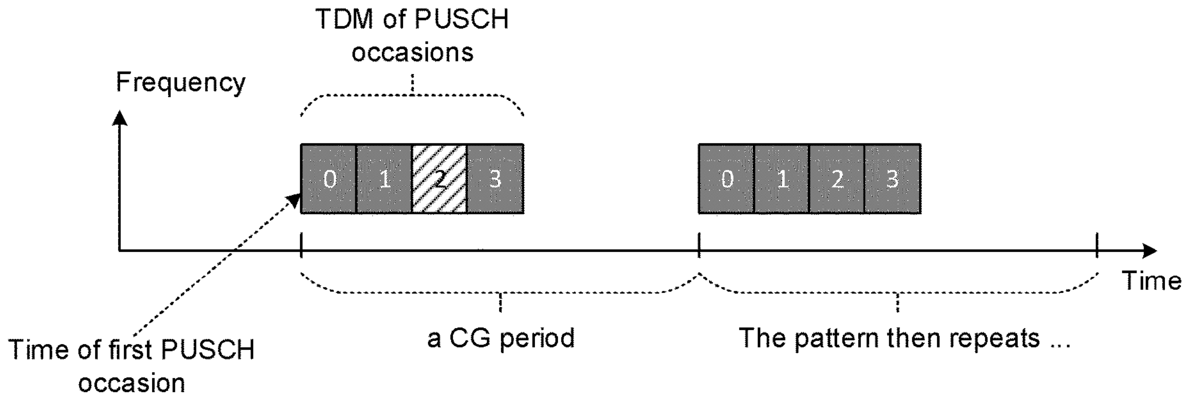
FIG. 4 is a diagram illustrating exemplary beam-based PUSCH resource selection for SDT according to an embodiment of the present disclosure.

FIG. 4 is a diagram illustrating exemplary beam-based PUSCH resource selection for SDT according to an embodiment of the present disclosure. As shown in FIG. 4, four SSBs may be configured, and four PUSCH occasions (e.g., PUSCH occasions 0, 1, 2, and 3) may be configured in each CG period. Each SSB may be associated with a PUSCH occasion in one CG period for SDT. For example, when the SSB 2 is selected, a corresponding PUSCH occasion 2 (the $3^{rd}$ PUSCH occasion in one CG period) may be used for SDT. In this case the $PL_{b,f,c}(q_d)$ parameter may be calculated by the UE based on the SSB with SSB index 2.

In some embodiments, the RS selected for pathloss estimation may be the RS resource from an SS/PBCH block with a same SS/PBCH block index as the one that the UE uses to obtain MIB.

In some embodiments, when the SSB beam is changed, one or more of the following operations may be applied for the power control of CG PUSCH:

- Suspend the TPC accumulation
  - As an example, when the SSB beam is changed, the UE may assume there's no TPC accumulation, and only absolute TPC command may be used for TPC:
    - $f_{b,f,c}(i, l)=\delta_{PUSCH,b,f,c}(i, l)$ is the PUSCH power control adjustment state for active UL BWP b of carrier f of serving cell c and PUSCH transmission occasion i if the SSB index selected for CG PUSCH resource selection is changed, where $\delta_{PUSCH,b,f,c}$ are the absolute values are given in Table 7.1.1-1 of 38.213 V16.4.0.
  - The TPC command may be a command received in DCI format 2_2 with CRC scrambled by TPC-PUSCH-RNTI, or may be a pre-determined value.
- Avoid at least part of the TPC commands, for example, the TPC commands received before the SSB beam is changed.
- Suspend the power update when SSB beam is changed
  - As an example, when SSB beam is changed, the PUSCH power control adjustment state can be set to be zero.

$$f_{b,f,c}(i, l)=0$$

- Continue doing the power update based on the latest power control parameters configured
  - In this case, even if the TPC command is received before the SSB beam is changed, it may be used for the power control adjustment state calculation.

In some embodiments, power ramping may be supported for CG PUSCH in SDT. In some embodiments, when SSB for CG PUSCH resource selection is changed, the power ramping may be suspended.

For example, $f_{b,f,c}(i, l)=f_{b,f,c}(i_0-1, l)+k*\Delta P_{rampup,b,f,c}$, where $\Delta P_{rampup,b,f,c}$ may be the power ramping step that can be used for power ramping of CG PUSCH in SDT, k is the power ramping counter, e.g., k=0 for the $1^{st}$ transmission, k is 1 for $2^{nd}$ transmission (e.g. a retransmission), k may be increased when the transmission number is increased until a maximum UE power is reached. In some embodiments, when SSB is changed for some CG PUSCH retransmission, k may be not increased.

In some embodiments, one or more of the following parameters may be separately configured and/or predetermined for power control of CG PUSCH for RRC inactive/idle state.

- The nominal p0 value for CG PUSCH power control: p0-NominalWithoutGrant

For example, when this parameter is configured in the RRC release message, it may be used for $P_{O\_NOMINAL\_PUSCH,f,c}(1)$ in the formula for PUSCH power calculation. However, if this is not provided in the RRC release message, the nominal p0 may be the same as the nominal p0 used for Msg3 PUSCH if the UE established dedicated RRC connection using 4-step RACH (a Type-1 random access procedure) or for MsgA PUSCH if UE established dedicated RRC connection using 2-step RACH (a Type-2 random access procedure).

```
• p0-NominalWithoutGrant        INTEGER (−202..24)
  OPTIONAL, -- Need M
```

one or more P0-PUSCH-AlphaSets for configuring p0 value and/or the path loss scaling factor alpha of the UE As an example, one or more of the following P0-PUSCH-AlphaSets may be configured in the RRC release message and which one is selected may be signalled by the p0-PUSCH-Alpha signalled in the ConfiguredGrantConfig.

```
●
● P0-PUSCH-AlphaSet ::=        SEQUENCE {
●   p0-PUSCH-AlphaSetId          P0-PUSCH-AlphaSetId,
●   p0                           INTEGER (−16..15)
  OPTIONAL, -- Need S
●   alpha                        Alpha
  OPTIONAL  -- Need S
● }
```

In another example, only one P0-PUSCH-AlphaSet may be configured in RRC release message, and the p0-PUSCH-Alpha may be not used.

In these 2 examples, when the P0-PUSCH-AlphaSets are not configured, for CG PUSCH power control for SDT, the p0 and the alpha for Msg3 PUSCH may be used when 4-step RACH (Type-1 random access procedure) was used to establish dedicated RRC connection, or the p0 and the alpha for MsgA PUSCH may be used when only 2-step RACH (Type-2 random access procedure) was used to establish dedicated RRC connection.

RS index for pathloss estimation.

E.g. it may be determined by "pathlossReferenceIndex" signalled in ConfiguredUplinkGrant IE in the RRC release message to determine one of a pre-configured set of reference signals for pathloss estimation in SDT.

RS set for pathloss estimation deltaMCS for determination of the delta power related to MCS used for the CG PUSCH transmission in SDT.

For example, a deltaMCS parameter may be comprised in the RRC release message to determine the $K_s$ value for calculation of the delta power related to MCS in the formula $$\Delta_{TF,b,j,c}(i) = 10\log_{10}\left(\left(2^{BPRBK_3} - 1\right)\cdot \beta_{offset}^{PUSCH}\right).$$

deltaMCS ENUMNERATED {enabled} OPTIONAL, --Need S tpc-Accumulation (or UE always assumes tpc-Accumulation is always provided or not provided)

For example, a tpc-Accumulation flag may be comprised in the RRC release message to indicate whether TPC accumulation should be applied or not for power calculation of a CG PUSCH in SDT.

tpc-Accumulation ENUMERATED {disabled} OPTIONAL, --Need S

In some embodiments, the configuration may be an RRC configuration or a configuration in MAC PDU or in DCI for CG PUSCH transmission for SDT. In some embodiments, a whole PUSCH-PowerControl IE for UEs in the RRC connected state may be configured in the dedicated RRC message for power control of CG PUSCH. In some embodiments, the PUSCH-PowerControl IE may be put in the RRC release message for this purpose.

In NR Rel-15 and Rel-16, a linear PUSCH power calculated may be further scaled by the scaling factor s when it's code book based transmission, depending on different full power mode configuration via the RRC signaling when UE is in the RRC connected mode. For PUSCH transmission in the RRC inactive/idle mode, how to determine and configure the full power mode may be addressed in following embodiment.

In some embodiments, one or more of the following parameters may be separately configured or predetermined for PUSCH power scaling determination in SDT:

PUSCH TX scheme configuration

As an example, a txConfig parameter may be comprised in the RRC release message to determine the transmission scheme of CG PUSCH in SDT

```
• txConfig            ENUMERATED { codebook, nonCodebook}
  OPTIONAL,  -- Need S
```

As another example, only nonCodebook based TX scheme may be used for CG PUSCH in SDT.

The uplink full power mode configuration

In one example, a ul-FullPowerTransmission-r17 parameter may be signalled in the RRC release message to determine the UL full power mode

```
• ul-FullPowerTransmission-r17     ENUMERATED { fullpower, fullpowerMode1,
  fullpowerMode2}  OPTIONAL,  -- Need R
```

In another example, "fullpower" mode may always be assumed for CG PUSCH SDT.

The SRS resource set

For example, a set of SRS resources may be configured in the RRC release message.

```
● -- ASN1START
● -- TAG-SRS-CONFIG-START
●
● SRS-Config ::=                          SEQUENCE {
●   srs-ResourceSetToReleaseList              SEQUENCE (SIZE(1..maxNrofSRS-
ResourceSets)) OF SRS-ResourceSetId                        OPTIONAL,   -- Need N
●   srs-ResourceSetToAddModList               SEQUENCE (SIZE(1..maxNrofSRS-
ResourceSets)) OF SRS-ResourceSet                          OPTIONAL,   -- Need N
●   srs-ResourceToReleaseList                 SEQUENCE (SIZE(1..maxNrofSRS-Resources))
OF SRS-ResourceId                     OPTIONAL,          -- Need N
●   srs-ResourceToAddModList                  SEQUENCE (SIZE(1..maxNrofSRS-Resources))
OF SRS-Resource                       OPTIONAL,          -- Need N
●   tpc-Accumulation                          ENUMERATED {disabled}
OPTIONAL,   -- Need S
●   ...,
●   [[
●   srs-RequestDCI-1-2-r16                    INTEGER (1..2)
OPTIONAL, -- Need S
●   srs-RequestDCI-0-2-r16                    INTEGER (1..2)
OPTIONAL, -- Need S
●   srs-ResourceSetToAddModListDCI-0-2-r16  SEQUENCE (SIZE(1..maxNrofSRS-
ResourceSets)) OF SRS-ResourceSet         OPTIONAL, -- Need N
●   srs-ResourceSetToReleaseListDCI-0-2-r16 SEQUENCE (SIZE(1..maxNrofSRS-
ResourceSets)) OF SRS-ResourceSetId       OPTIONAL, -- Need N
●   srs-PosResourceSetToReleaseList-r16       SEQUENCE (SIZE(1..maxNrofSRS-
PosResourceSets-r16)) OF SRS-PosResourceSetId-r16
●
OPTIONAL, -- Need N
●   srs-PosResourceSetToAddModList-r16        SEQUENCE (SIZE(1..maxNrofSRS-
PosResourceSets-r16)) OF SRS-PosResourceSet-r16             OPTIONAL,-- Need N
●   srs-PosResourceToReleaseList-r16          SEQUENCE (SIZE(1..maxNrofSRS-
PosResources-r16)) OF SRS-PosResourceId-r16                 OPTIONAL,-- Need N
●   srs-PosResourceToAddModList-r16           SEQUENCE (SIZE(1..maxNrofSRS-
PosResources-r16)) OF SRS-PosResource-r16                   OPTIONAL -- Need N
●   ]]
● }
```

In some embodiments, the power scaling may be a predetermined value for CG PUSCH power calculation in SDT, for example, a fixed value of 1 (i.e., no scaling).

With the above power control mechanism, transmission power of CG PUSCH for a UE's SDT in the RRC inactive or idle state may be controlled, such that the power utilization efficiency may be improved, especially when multi-beam operation for CG-based SDT is supported for robust PUSCH transmissions.

Figure 5:
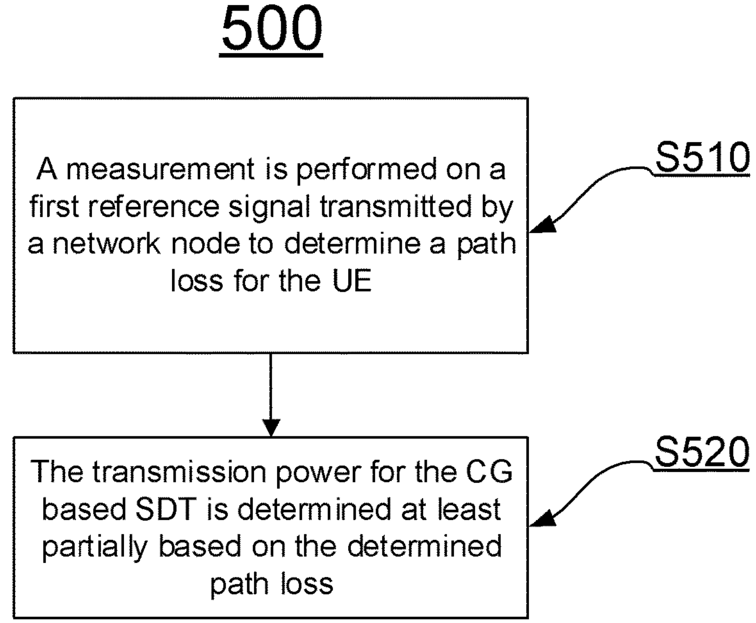
FIG. 5 is a flow chart illustrating an exemplary method at a UE for controlling transmission power for CG based SDT in a non-connected state according to an embodiment of the present disclosure.

FIG. 5 is a flow chart of an exemplary method 500 at a user equipment (UE) for controlling transmission power for CG based SDT in a non-connected state according to an embodiment of the present disclosure. The method 500 may be performed at a user equipment (e.g., the UE 110). The method 500 may comprise step S510 and step S520. However, the present disclosure is not limited thereto. In some other embodiments, the method 500 may comprise more steps, less steps, different steps or any combination thereof. Further the steps of the method 500 may be performed in a different order than that described herein. Further, in some embodiments, a step in the method 500 may be split into multiple sub-steps and performed by different entities, and/or multiple steps in the method 500 may be combined into a single step.

The method 500 may begin at step S510 where a measurement may be performed on a first reference signal transmitted by a network node to determine a path loss for the UE.

At step S520, the transmission power for the CG based SDT may be determined at least partially based on the determined path loss.

In some embodiments, the method 500 may further comprise: receiving a configured grant from the network node which indicates one or more uplink transmission occasions for SDT; and determining a reference signal associated with at least one of the uplink transmission occasions, as the first reference signal. In some embodiments, the method 500 may further comprise: transmitting, to the network node, one or more data bits for SDT over the at least one uplink transmission occasion associated with the first reference signal. In some embodiments, the first reference signal may be an SSB or a CSI-RS.

In some embodiments, the method 500 may further comprise: receiving a message which is associated with the first reference signal and broadcasted by the network node. In some embodiments, the message may be an RRC MIB message and the first reference signal may be an SSB associated with the RRC MIB message.

In some embodiments, the method 500 may further comprise one or more of: suspending TPC accumulation for the UE in response to determining that a second reference signal which is different from the first reference signal is received; neglecting at least a part of TPC commands for the UE in response to determining that a second reference signal which is different from the first reference signal is received; suspending power update for the UE in response to determining that a second reference signal which is different from the first reference signal is received; and continuing the power update based on the latest configured power control parameters in response to determining that a second reference signal which is different from the first reference signal is received.

In some embodiments, the TPC commands that are neglected may be the TPC commands received before the second reference signal is received. In some embodiments, the step of suspending power update for the UE may comprise: suspending an update procedure for updating the Physical Uplink Shared Channel (PUSCH) power control adjustment state for the UE. In some embodiments, the step of suspending TPC accumulation for the UE may comprise: performing only absolute TPC commands from the network node for the UE. In some embodiments, the step of determining the transmission power for the CG based SDT at least partially based on the determined path loss may comprise: determining the transmission power for the CG based SDT further based on a PUSCH power control adjustment state which is determined by a TPC command with an absolute value received from the network node. In some embodiments, the TPC command may be received in a DCI format 2-2 message with CRC scrambled by TPC-PUSCH-RNTI. In some embodiments, the TPC command may have a predetermined value. In some embodiments, the step of determining the transmission power for the CG based SDT at least partially based on the determined path loss may comprise: determining the transmission power for the CG based SDT further based on a PUSCH power control adjustment state which has a zero value.

In some embodiments, the step of determining the transmission power for the CG based SDT at least partially based on the determined path loss may comprise: determining the transmission power for the CG based SDT further based on a PUSCH power control adjustment state $f_{b,f,c}(i, l)$ for active uplink (UL) bandwidth part (BWP) b of carrier f of serving cell c and PUSCH transmission occasion i, wherein the PUSCH power control adjustment state may comprise one or more power ramping steps. In some embodiments, the PUSCH power control adjustment state $f_{b,f,c}(i, l)$ may be determined as follows: $f_{b,f,c}(i, l)=f_{b,f,c}(i-1, l)+k*\Delta P_{rampup,b,f,c}$, where $\Delta P_{rampup,b,f,c}$ is a power ramping step, k is the power ramping counter, and l is the index of the PUSCH power control adjustment state $f_{b,f,c}(i, l)$. In some embodiments, the method 500 may further comprise: suspending power ramping for the UE in response to determining that a second reference signal which is different from the first reference signal is received. In some embodiments, the non-connected state may be an RRC_INACTIVE state or an RRC_IDLE state while the connected state may be an RRC_CONNECTED state.

Figure 6:
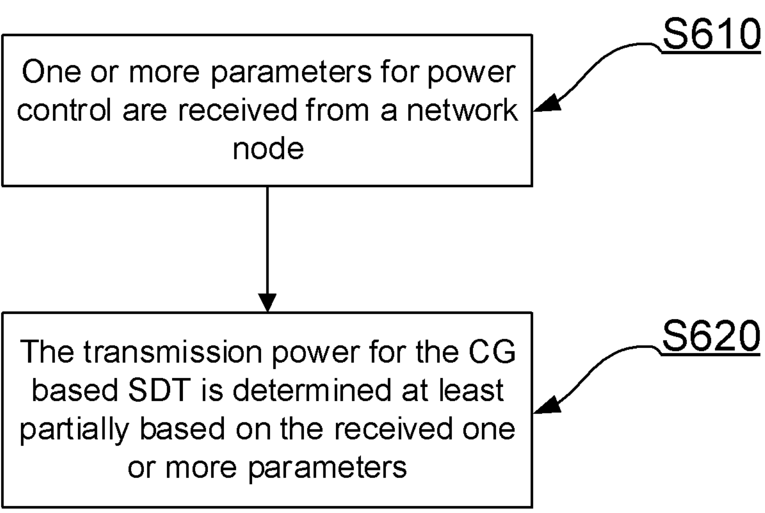
FIG. 6 is a flow chart illustrating another exemplary method at a UE for controlling transmission power for CG based SDT in a non-connected state according to another embodiment of the present disclosure.

FIG. 6 is a flow chart of an exemplary method 600 at a user equipment (UE) for controlling transmission power for CG based SDT in a non-connected state according to an embodiment of the present disclosure. The method 600 may be performed at a user equipment (e.g., the UE 110). The method 600 may comprise step S610 and step S620. However, the present disclosure is not limited thereto. In some other embodiments, the method 600 may comprise more steps, less steps, different steps or any combination thereof. Further the steps of the method 600 may be performed in a different order than that described herein. Further, in some embodiments, a step in the method 600 may be split into multiple sub-steps and performed by different entities, and/or multiple steps in the method 600 may be combined into a single step.

The method 600 may begin at step S610 where one or more parameters for power control may be received from a network node.

At step S620, the transmission power for the CG based SDT may be determined at least partially based on the received one or more parameters.

In some embodiments, the one or more parameters may comprise at least one of: a parameter indicating a nominal value for CG based SDT power control; one or more parameters indicating one or more P0 values and/or path loss scaling factors; a parameter indicating a reference signal index for path loss estimation; a parameter for determining delta power related to Modulation & Coding Scheme (MCS) used for the CG-based SDT; and a parameter indicating whether TPC accumulation is enabled or not. In some embodiments, at least one of the one or more parameters may be received via an RRC message, a Medium Access Control (MAC) Protocol Data Unit (PDU) message, and/or a DCI message. In some embodiments, the RRC message may be dedicated for the UE's SDT power control and comprises a whole PUSCH-PowerControl Information Element (IE). In some embodiments, the RRC message may be an RRC release message which triggers the UE to transition into the non-connected state.

In some embodiments, the step of determining the transmission power for the CG based SDT at least partially based on the received one or more parameters may comprise: determining the transmission power for the CG based SDT further based on a parameter indicating a nominal value for power control for Msg3 PUSCH when a 4-step Random Access Channel (RACH) procedure was previously involved or a nominal value for MsgA PUSCH when a 2-step RACH procedure was previously involved, in response to determining that the one or more parameters comprises no parameter indicating a nominal value for CG based SDT power control.

In some embodiments, the one or more parameters may further comprise a parameter indicating which of the P0-PUSCH-AlphaSets is selected if more than one parameter indicating P0-PUSCH-AlphaSets are received. In some embodiments, the step of determining the transmission power for the CG based SDT at least partially based on the received one or more parameters may comprise: determining the transmission power for the CG based SDT further based on a parameter indicating a P0 value and/or a path loss scaling factor for power control for Msg3 PUSCH when a 4-step Random Access Channel (RACH) procedure was previously involved or a P0 value and/or a path loss scaling factor for MsgA PUSCH when a 2-step RACH procedure was previously involved, in response to determining that the one or more parameters comprises no parameter indicating a P0 value for CG based SDT power control and/or no parameter indicating a path loss scaling factor for the UE.

In some embodiments, the one or more parameters may comprise at least one of: a parameter indicating an uplink transmission scheme configuration; a parameter indicating an uplink full power mode configuration; and a Sounding Reference Signal (SRS) resource set. In some embodiments, the parameter indicating an uplink transmission scheme configuration may indicate that only non-Codebook based TX scheme is used for CG-based SDT. In some embodiments, the parameter indicating an uplink full power mode configuration may have a predetermined value of "full-power". In some embodiments, the step of determining the transmission power for the CG based SDT at least partially based on the received one or more parameters may comprise: determining the transmission power for the CG based SDT at least partially based on the received one or more parameters with a predetermined power scaling value being used.

Figure 7:
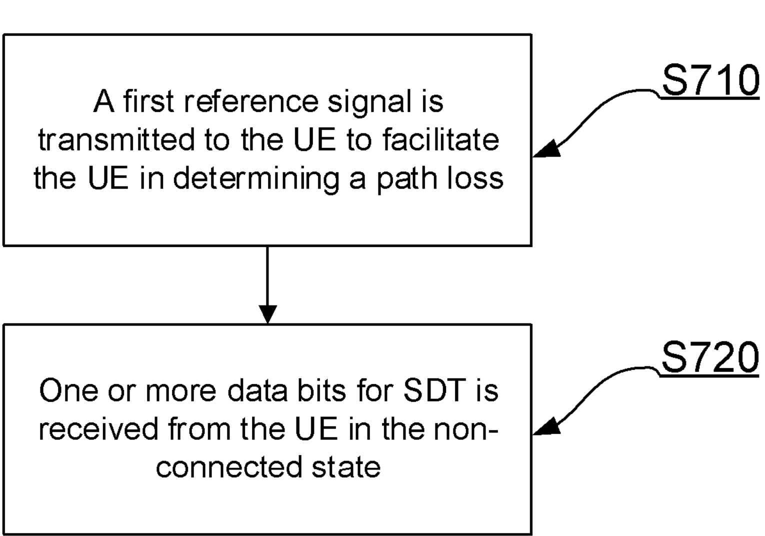
FIG. 7 is a flow chart illustrating an exemplary method at a network node for controlling transmission power for CG based SDT for a UE in a non-connected state according to an embodiment of the present disclosure.

FIG. 7 is a flow chart of an exemplary method 700 at a network node for controlling transmission power for CG based SDT for a UE in a non-connected state according to an embodiment of the present disclosure. The method 700 may be performed at a network node (e.g., the gNB 120). The method 700 may comprise step S710 and step S720. However, the present disclosure is not limited thereto. In some other embodiments, the method 700 may comprise more steps, less steps, different steps or any combination thereof. Further the steps of the method 700 may be performed in a different order than that described herein. Further, in some embodiments, a step in the method 700 may be split into multiple sub-steps and performed by different entities, and/or multiple steps in the method 700 may be combined into a single step.

The method 700 may begin at step S710 where a first reference signal may be transmitted to the UE to facilitate the UE in determining a path loss.

At step S720, one or more data bits for SDT may be received from the UE in the non-connected state.

In some embodiments, the method 700 may further comprise: transmitting, to the UE, a configured grant which indicates one or more uplink transmission occasions for SDT. In some embodiments, the step of receiving, from the UE in the non-connected state, one or more data bits for SDT may comprise: receiving, from the UE in the non-connected state, one or more data bits for SDT over the at least one uplink transmission occasion associated with the first reference signal. In some embodiments, the first reference signal may be an SSB or a CSI-RS. In some embodiments, the method 700 may further comprise: broadcasting a message which is associated with the first reference signal. In some embodiments, the message may be an RRC MIB message and the first reference signal may be an SSB associated with the RRC MIB message. In some embodiments, the non-connected state may be an RRC_INACTIVE state or an RRC_IDLE state while the connected state may be an RRC_CONNECTED state.

Figure 8:
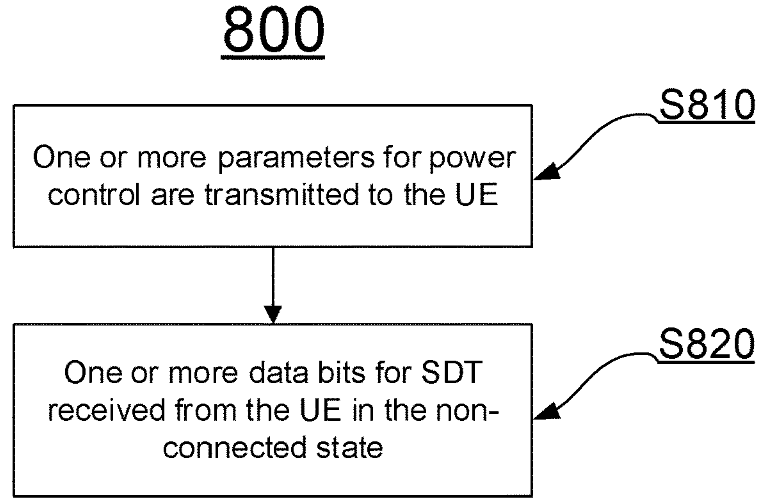
FIG. 8 is a flow chart illustrating another exemplary method at a network node for controlling transmission power for CG based SDT for a UE in a non-connected state according to another embodiment of the present disclosure.

FIG. 8 is a flow chart of an exemplary method 800 at a network node for controlling transmission power for CG based SDT for a UE in a non-connected state according to an embodiment of the present disclosure. The method 800 may be performed at a network node (e.g., the gNB 120). The method 800 may comprise step S810 and step S820. However, the present disclosure is not limited thereto. In some other embodiments, the method 800 may comprise more steps, less steps, different steps or any combination thereof. Further the steps of the method 800 may be performed in a different order than that described herein. Further, in some embodiments, a step in the method 800 may be split into multiple sub-steps and performed by different entities, and/or multiple steps in the method 800 may be combined into a single step.

The method 800 may begin at step S810 where one or more parameters for power control may be transmitted to the UE.

At step S820, one or more data bits for SDT may be received from the UE in the non-connected state.

In some embodiments, the one or more parameters may comprise at least one of: a parameter indicating a nominal value for CG based SDT power control; one or more parameters indicating one or more P0 values and/or path loss scaling factors; a parameter indicating a reference signal index for path loss estimation; a parameter for determining delta power related to Modulation & Coding Scheme (MCS) used for the CG-based SDT; and a parameter indicating whether TPC accumulation is enabled or not.

In some embodiments, at least one of the one or more parameters may be transmitted via an RRC message, a MAC PDU message, and/or a DCI message. In some embodiments, the RRC message may be dedicated for the UE's SDT power control and comprise a whole PUSCH-Power-Control Information Element (IE). In some embodiments, the RRC message may be an RRC release message which triggers the UE to transition into the non-connected state. In some embodiments, the one or more parameters may further comprise a parameter indicating which of the P0-PUSCH-AlphaSets is selected if more than one parameter indicating P0-PUSCH-AlphaSets are received.

In some embodiments, the one or more parameters may comprise at least one of: a parameter indicating an uplink transmission scheme configuration; a parameter indicating an uplink full power mode configuration; and a Sounding Reference Signal (SRS) resource set. In some embodiments, the parameter indicating an uplink transmission scheme configuration may indicate that only non-Codebook based transmission scheme is used for CG-based SDT. In some embodiments, the parameter indicating an uplink full power mode configuration may have a predetermined value of "fullpower".

Figure 9:
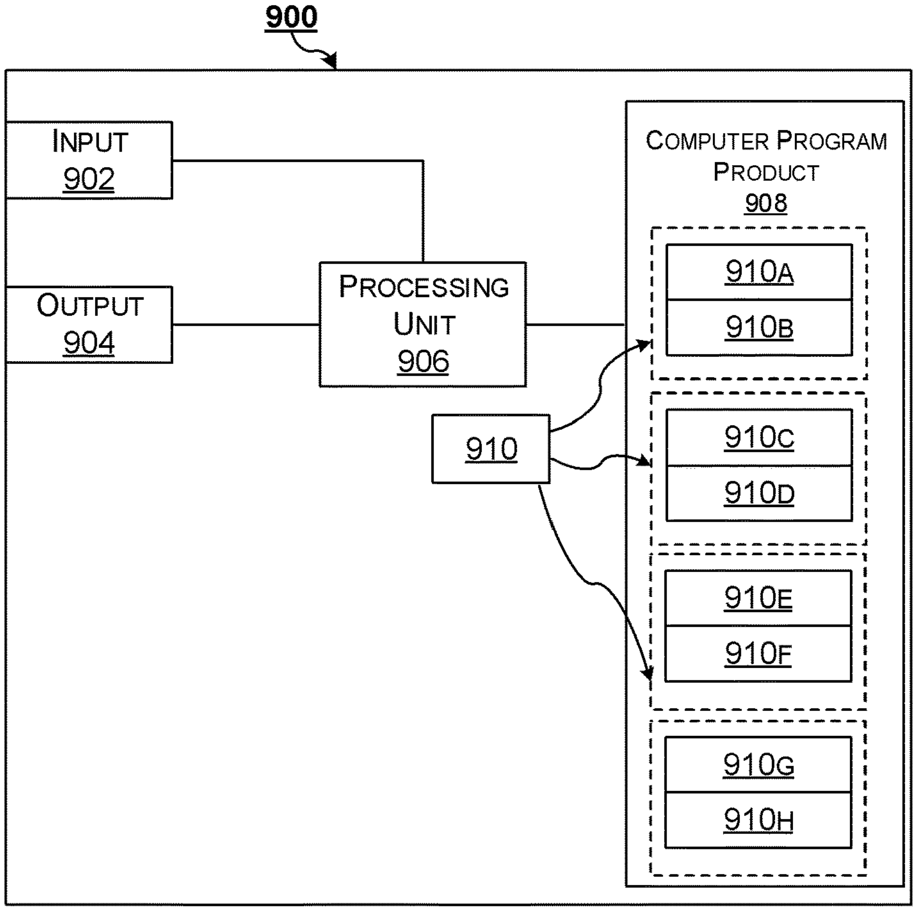
FIG. 9 schematically shows an embodiment of an arrangement which may be used in a UE or a network node according to an embodiment of the present disclosure.

FIG. 9 schematically shows an embodiment of an arrangement 900 which may be used in a user equipment (e.g., the UE 110) or a network node (e.g., the gNB 120) according to an embodiment of the present disclosure. Comprised in the arrangement 900 are a processing unit 906, e.g., with a Digital Signal Processor (DSP) or a Central Processing Unit (CPU). The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit 902 and the output unit 904 may be arranged as an integrated entity or as separate entities.

Furthermore, the arrangement 900 may comprise at least one computer program product 908 in the form of a non-volatile or volatile memory, e.g., an Electrically Erasable Programmable Read-Only Memory (EEPROM), a flash memory and/or a hard drive. The computer program product 908 comprises a computer program 910, which comprises code/computer readable instructions, which when executed by the processing unit 906 in the arrangement 900 causes the arrangement 900 and/or the UE/network node in which it is comprised to perform the actions, e.g., of the procedure described earlier in conjunction with FIG. 5 to FIG. 8 or any other variant.

The computer program 910 may be configured as a computer program code structured in computer program modules 910A and 910B. Hence, in an exemplifying embodiment when the arrangement 900 is used in a UE, the code in the computer program of the arrangement 900 includes: a module 910A for performing a measurement on a first reference signal transmitted by a network node to determine a path loss for the UE; and a module 910B for determining the transmission power for the CG based SDT at least partially based on the determined path loss.

Further, the computer program 910 may be further configured as a computer program code structured in computer program modules 910C and 910D. Hence, in an exemplifying embodiment when the arrangement 900 is used in a UE, the code in the computer program of the arrangement 900 includes: a module 910C for receiving, from a network node, one or more parameters for power control; and a module 910D for determining the transmission power for the CG based SDT at least partially based on the received one or more parameters.

Further, the computer program 910 may be further configured as a computer program code structured in computer program modules 910E and 910F. Hence, in an exemplifying embodiment when the arrangement 900 is used in a network node, the code in the computer program of the arrangement 900 includes: a module 910E for transmitting, to the UE, a first reference signal to facilitate the UE in determining a path loss; and a module 910F for receiving, from the UE in the non-connected state, one or more data bits for SDT.

Further, the computer program 910 may be further configured as a computer program code structured in computer program modules 910G and 910H. Hence, in an exemplifying embodiment when the arrangement 900 is used in a network node, the code in the computer program of the arrangement 900 includes: a module 910G for transmitting, to the UE, one or more parameters for power control; and a module 910H for receiving, from the UE in the non-connected state, one or more data bits for SDT.

The computer program modules could essentially perform the actions of the flow illustrated in FIG. 5 to FIG. 8, to emulate the UE or the network node. In other words, when the different computer program modules are executed in the processing unit 906, they may correspond to different modules in the UE or the network node.

Although the code means in the embodiments disclosed above in conjunction with FIG. 9 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

Figure 10:
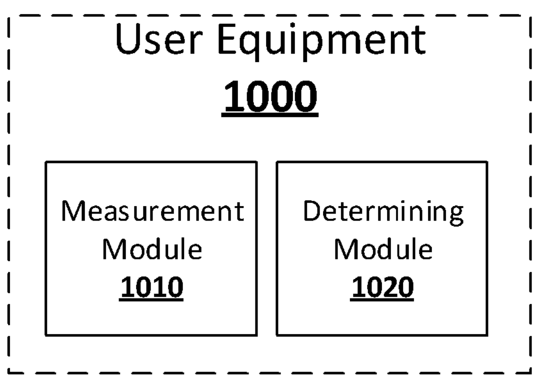
FIG. 10 is a block diagram of an exemplary UE according to an embodiment of the present disclosure.

Correspondingly to the method 500 as described above, an exemplary user equipment is provided. FIG. 10 is a block diagram of a UE 1000 according to an embodiment of the present disclosure. The UE 1000 may be, e.g., the UE 110 in some embodiments.

The UE 1000 may be configured to perform the method 500 as described above in connection with FIG. 5. As shown in FIG. 10, the UE 1000 may comprise a measurement module 1010 for performing a measurement on a first reference signal transmitted by a network node to determine a path loss for the UE; a determining module 1020 for determining the transmission power for the CG based SDT at least partially based on the determined path loss.

The above modules 1010 and/or 1020 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5. Further, the UE 1000 may comprise one or more further modules, each of which may perform any of the steps of the method 500 described with reference to FIG. 5.

Figure 11:
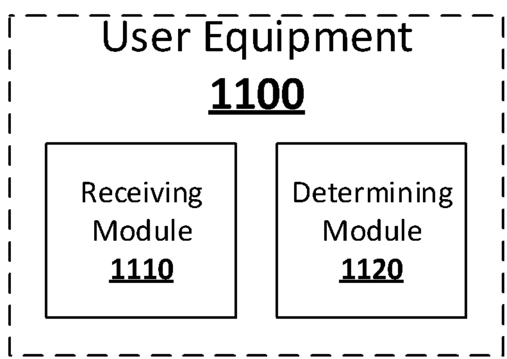
FIG. 11 is a block diagram of another exemplary UE according to another embodiment of the present disclosure.

Correspondingly to the method 600 as described above, an exemplary user equipment is provided. FIG. 11 is a block diagram of a UE 1100 according to an embodiment of the present disclosure. The UE 1100 may be, e.g., the UE 110 in some embodiments.

The UE 1100 may be configured to perform the method 600 as described above in connection with FIG. 6. As shown in FIG. 11, the UE 1100 may comprise a receiving module 1110 for receiving, from a network node, one or more parameters for power control; and a determining module 1120 for determining the transmission power for the CG based SDT at least partially based on the received one or more parameters.

The above modules 1110 and/or 1120 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 6. Further, the UE 1100 may comprise one or more further modules, each of which may perform any of the steps of the method 600 described with reference to FIG. 6.

Figure 12:
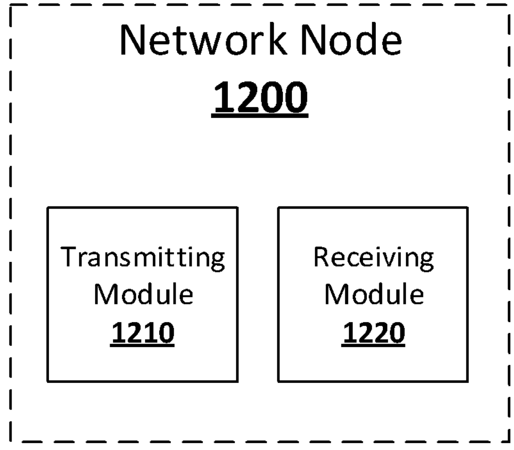
FIG. 12 is a block diagram of an exemplary network node according to an embodiment of the present disclosure.

Correspondingly to the method 700 as described above, a network node is provided. FIG. 12 is a block diagram of an exemplary network node 1200 according to an embodiment of the present disclosure. The network node 1200 may be, e.g., the gNB 120 in some embodiments.

The network node 1200 may be configured to perform the method 700 as described above in connection with FIG. 7. As shown in FIG. 12, the network node 1200 may comprise a transmitting module 1210 for transmitting, to the UE, a first reference signal to facilitate the UE in determining a path loss; and a receiving module 1220 for receiving, from the UE in the non-connected state, one or more data bits for SDT.

The above modules 1210 and/or 1220 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 7. Further, the network node 1200 may comprise one or more further modules, each of which may perform any of the steps of the method 700 described with reference to FIG. 7.

Figure 13:
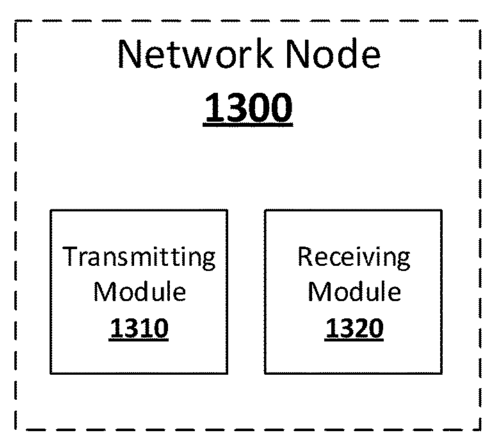
FIG. 13 is a block diagram of another exemplary network node according to another embodiment of the present disclosure.

Correspondingly to the method 800 as described above, a network node is provided. FIG. 13 is a block diagram of an exemplary network node 1300 according to an embodiment of the present disclosure. The network node 1300 may be, e.g., the gNB 120 in some embodiments.

The network node 1300 may be configured to perform the method 800 as described above in connection with FIG. 8. As shown in FIG. 13, the network node 1300 may comprise a transmitting module 1310 for transmitting, to the UE, one or more parameters for power control; and a receiving module 1320 for receiving, from the UE in the non-connected state, one or more data bits for SDT.

The above modules 1310 and/or 1320 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 8. Further, the network node 1300 may comprise one or more further modules, each of which may perform any of the steps of the method 800 described with reference to FIG. 8.

Figure 14:
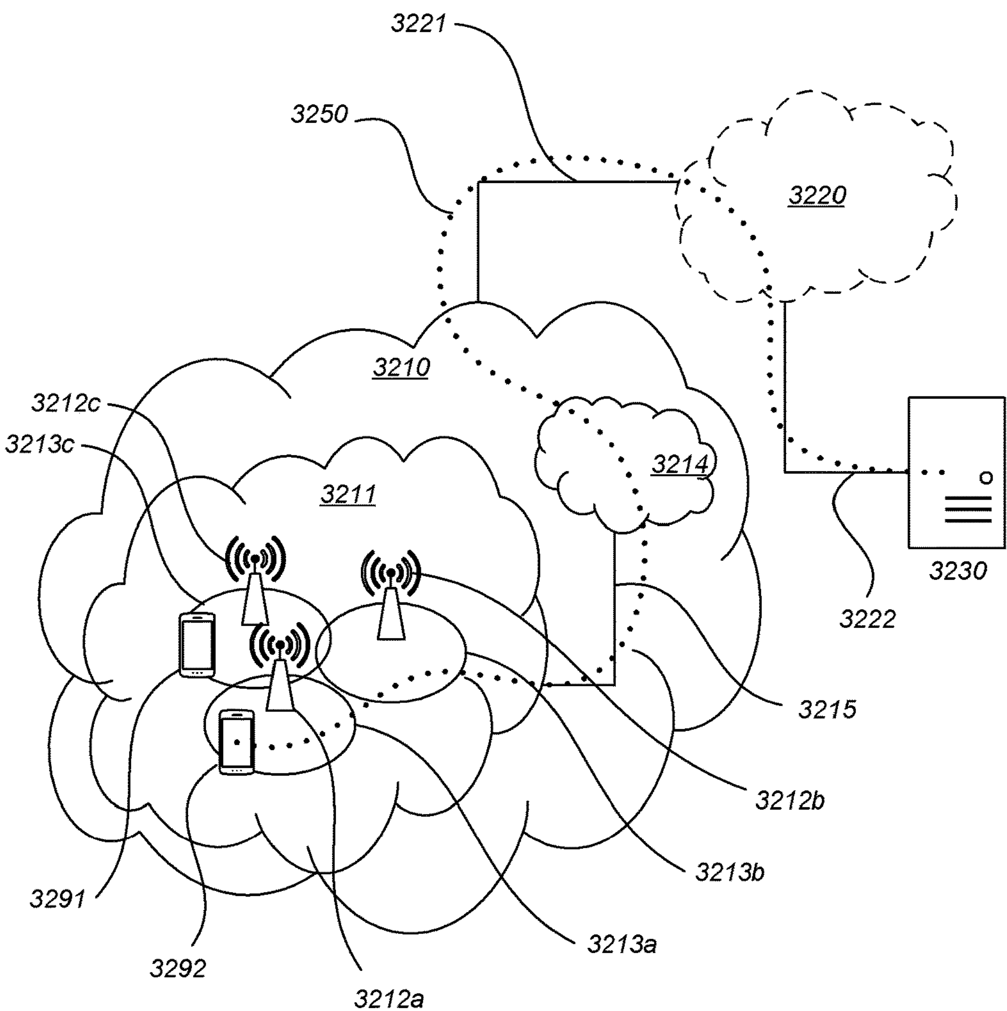
FIG. 14 schematically illustrates a telecommunication network connected via an intermediate network to a host computer according to an embodiment of the present disclosure.

With reference to FIG. 14, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
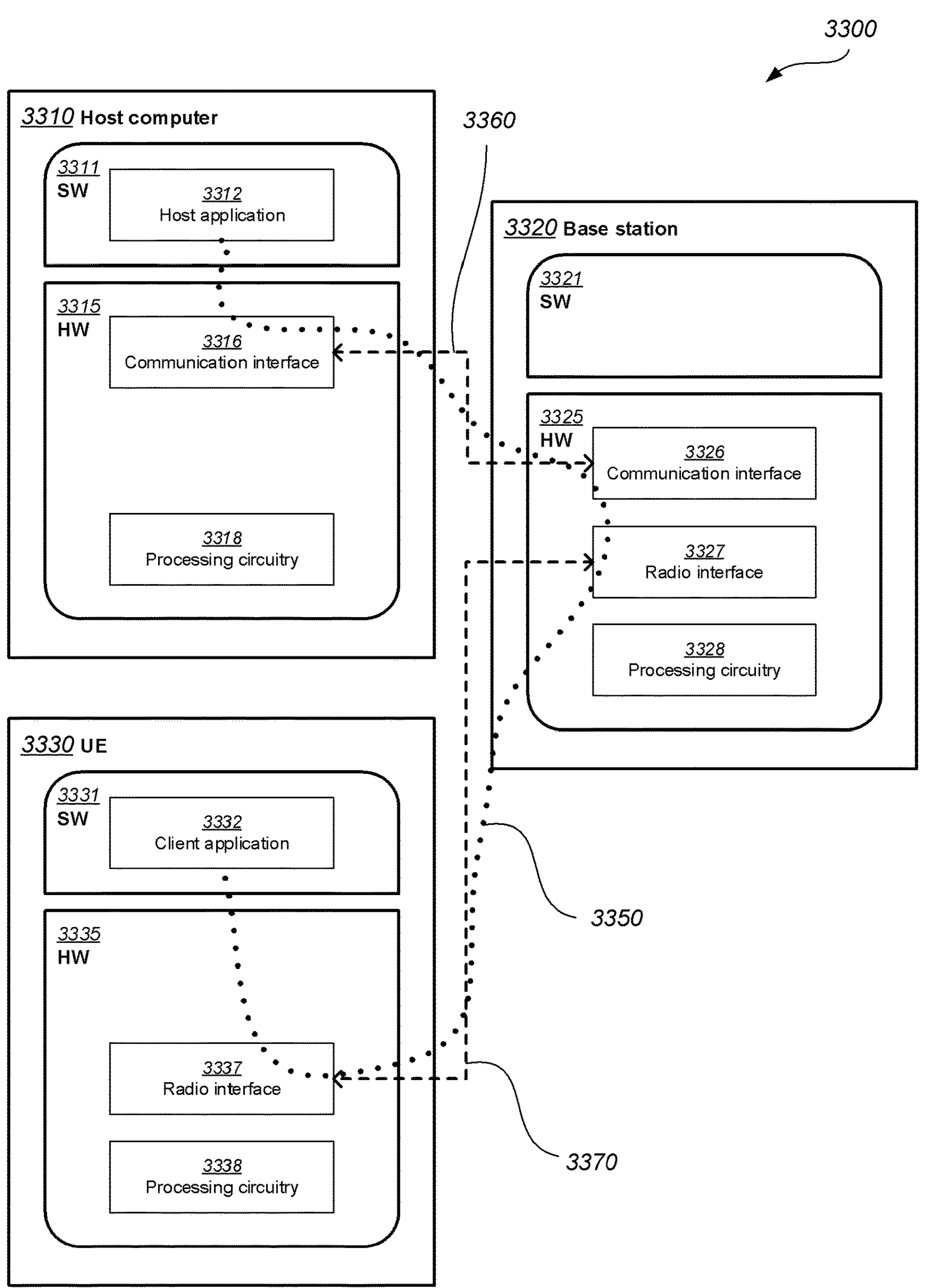
FIG. 15 is a generalized block diagram of a host computer communicating via a base station with a user equipment over a partially wireless connection according to an embodiment of the present disclosure.

It is noted that the host computer 3310, base station 3320 and UE 3330 illustrated in FIG. 15 may be identical to the host computer 3230, one of the base stations 3212*a*, 3212*b*, 3212*c* and one of the UEs 3291, 3292 of FIG. 14, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure One or more of the various embodiments improve the performance of OTT services provided to the UE 3330 using the OTT connection 3350, in which the wireless connection 3370 forms the last segment. More precisely, the teachings of these embodiments may improve the latency and power consumption and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 16:
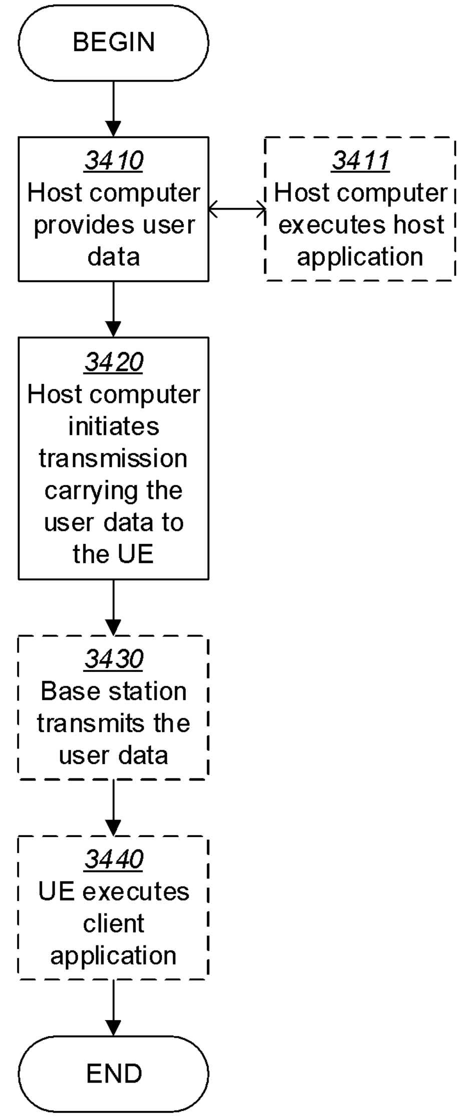
FIG. 16 to FIG. 19 are flowcharts illustrating methods implemented in a communication system including a host computer, a base station and a user equipment according to an embodiment of the present disclosure.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 17:
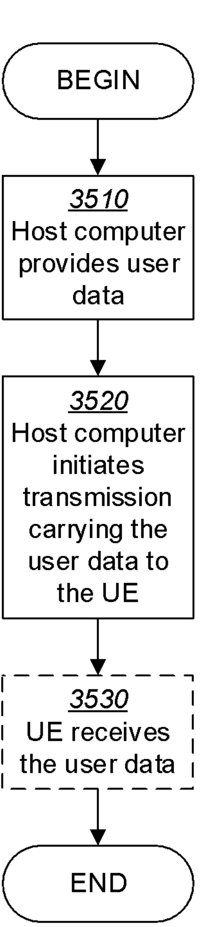

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 18:
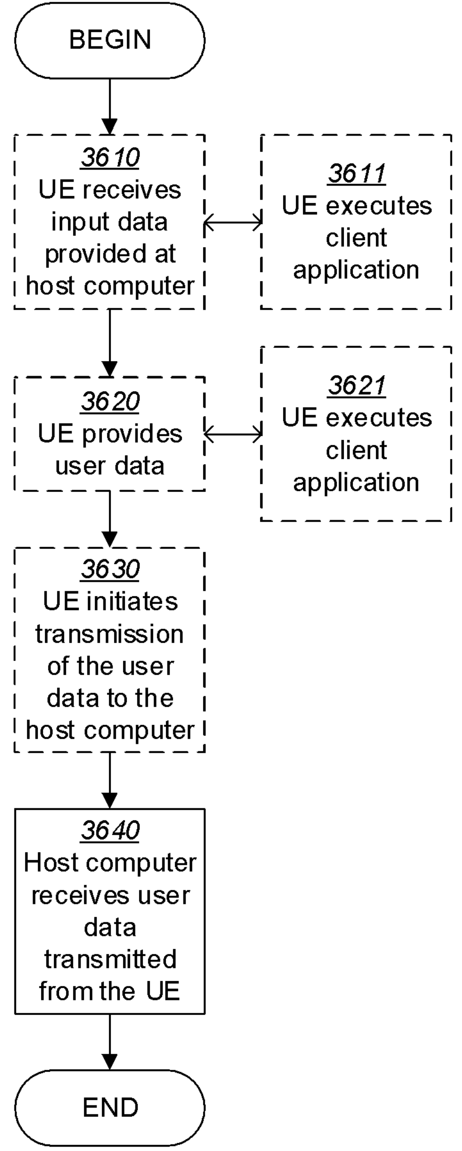

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 19:
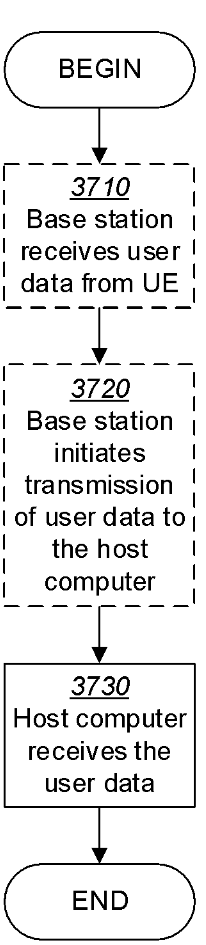

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

Abbreviation Explanation
CG Configured Grant
NR New radio
PUSCH Physical Uplink Shared Channel
RACH Random Access Channel
SDT Small Data Transmission
SSB SS/PBCH block

What is claimed is:

1. A method at a user equipment (UE) for controlling transmission power for configured grant (CG) based small data transmission (SDT) in a non-connected state, the method comprising:

performing a measurement on a first reference signal transmitted by a network node to determine a path loss for the UE; and determining the transmission power for the CG based SDT at least partially based on the determined path loss;

wherein the step of determining the transmission power for the CG based SDT at least partially based on the determined path loss comprises:

determining the transmission power for the CG based SDT further based on a PUSCH power control adjustment state $f_{b,f,c}(i, l)$ for active uplink (UL) bandwidth part (BWP) b of carrier f of serving cell c and PUSCH transmission occasion i, wherein the PUSCH power control adjustment state comprises one or more power ramping steps.

2. The method of claim 1, further comprising:

receiving a configured grant from the network node which indicates one or more uplink transmission occasions for SDT; and determining a reference signal associated with at least one of the uplink transmission occasions, as the first reference signal.

3. The method of claim 1, further comprising:

transmitting, to the network node, one or more data bits for SDT over the at least one uplink transmission occasion associated with the first reference signal.

4. The method of claim 1, wherein the first reference signal is a synchronous signal block (SSB) or a Channel State Information-Reference Signal (CSI-RS).

5. The method of claim 1, further comprising:

receiving a message which is associated with the first reference signal and broadcasted by the network node.

6. The method of claim 5, wherein the message is a Radio Resource Control (RRC) Master Information Block (MIB) message and the first reference signal is a synchronous signal block (SSB) associated with the RRC MIB message.

7. The method of claim 1, wherein the PUSCH power control adjustment state $f_{b,f,c}(i, l)$ is determined as follows:

$$f_{b,f,c}(i, l)=f_{b,f,c}(i-1, l)+k*\Delta P_{rampup,b,f,c}$$

where $\Delta P_{rampup,b,f,c}$ is a power ramping step, k is the power ramping counter, and l is the index of the PUSCH power control adjustment state $f_{b,f,c}(i, l)$.

8. The method of claim 1, further comprising:

suspending power ramping for the UE in response to determining that a second reference signal which is different from the first reference signal is received.

9. The method of claim 1, wherein the non-connected state is an RRC_INACTIVE state or an RRC_IDLE state while the connected state is an RRC_CONNECTED state.

10. A method at a user equipment (UE) for controlling transmission power for configured grant (CG) based small data transmission (SDT) in a non-connected state, the method comprising:

receiving, from a network node, one or more parameters for power control; and determining the transmission power for the CG based SDT at least partially based on the received one or more parameters;

wherein the one or more parameters comprise at least one of:

a parameter indicating a nominal value for CG based SDT power control;

one or more parameters indicating one or more P0 values and/or path loss scaling factors;

a parameter indicating a reference signal index for path loss estimation;

a parameter for determining delta power related to Modulation & Coding Scheme (MCS) used for the CG-based SDT; and a parameter indicating whether TPC accumulation is enabled or not.

11. The method of claim 10, wherein at least one of the one or more parameters is received via an RRC message, a Medium Access Control (MAC) Protocol Data Unit (PDU) message, and/or a DCI message, wherein the RRC message is dedicated for the UE's SDT power control and comprises a whole PUSCH-PowerControl Information Element (IE).

12. The method of claim 11, wherein the RRC message is an RRC release message which triggers the UE to transition into the non-connected state.

13. The method of claim 10, wherein the step of determining the transmission power for the CG based SDT at least partially based on the received one or more parameters comprises:

determining the transmission power for the CG based SDT further based on a parameter indicating a nominal value for power control for Msg3 PUSCH when a 4-step Random Access Channel (RACH) procedure was previously involved or a nominal value for MsgA PUSCH when a 2-step RACH procedure was previously involved, in response to determining that the one or more parameters comprises no parameter indicating a nominal value for CG based SDT power control.

14. The method of claim 10, wherein the one or more parameters further comprise a parameter indicating which of the P0-PUSCH-AlphaSets is selected if more than one parameter indicating P0-PUSCH-AlphaSets are received.

15. The method of claim 10, wherein the step of determining the transmission power for the CG based SDT at least partially based on the received one or more parameters comprises:

determining the transmission power for the CG based SDT further based on a parameter indicating a P0 value and/or a path loss scaling factor for power control for Msg3 PUSCH when a 4-step Random Access Channel (RACH) procedure was previously involved or a P0 value and/or a path loss scaling factor for MsgA PUSCH when a 2-step RACH procedure was previously involved, in response to determining that the one or more parameters comprises no parameter indicating a P0 value for CG based SDT power control and/or no parameter indicating a path loss scaling factor for the UE.

16. The method of claim 10, wherein the one or more parameters comprise at least one of:

a parameter indicating an uplink transmission scheme configuration;

a parameter indicating an uplink full power mode configuration; and a Sounding Reference Signal (SRS) resource set, wherein the parameter indicating an uplink transmission scheme configuration indicates that only non-Codebook based TX scheme is used for CG-based SDT.

17. The method of claim 10, wherein the step of determining the transmission power for the CG based SDT at least partially based on the received one or more parameters comprises:

determining the transmission power for the CG based SDT at least partially based on the received one or more parameters with a predetermined power scaling value being used.

18. A user equipment (UE), comprising:

a processor;

a memory storing instructions which, when executed by the processor, cause the processor to perform:

receiving, from a network node, one or more parameters for power control; and determining the transmission power for the configured grant (CG) based small data transmission (SDT) at least partially based on the one or more parameters;

wherein the one or more parameters comprise at least one of:

a parameter indicating a nominal value for CG based SDT power control;

one or more parameters indicating one or more P0 values and/or path loss scaling factors;

a parameter indicating a reference signal index for path loss estimation;

a parameter for determining delta power related to Modulation & Coding Scheme (MCS) used for the CG-based SDT; and a parameter indicating whether TPC accumulation is enabled or not.

* * * * *